(12) United States Patent
Cidon et al.

(10) Patent No.: US 8,977,661 B2
(45) Date of Patent: Mar. 10, 2015

(54) SYSTEM, METHOD AND COMPUTER READABLE MEDIUM FOR FILE MANAGEMENT

(71) Applicants: Asaf Cidon, San Francisco, CA (US); Gopal Madan Prabandham, Los Altos, CA (US); Israel Cidon, Palo Alto, CA (US); Shetty Chandrashekhar, Naperville, IL (US); Lior Gavish, San Francisco, CA (US); Barak Srour, Mountain View, CA (US)

(72) Inventors: Asaf Cidon, San Francisco, CA (US); Gopal Madan Prabandham, Los Altos, CA (US); Israel Cidon, Palo Alto, CA (US); Shetty Chandrashekhar, Naperville, IL (US); Lior Gavish, San Francisco, CA (US); Barak Srour, Mountain View, CA (US)

(73) Assignee: Sookasa Inc., Mountain View, CA (US)

( * ) Notice: Subject to any disclaimer, the term of this patent is extended or adjusted under 35 U.S.C. 154(b) by 44 days.

(21) Appl. No.: 13/726,643

(22) Filed: Dec. 26, 2012

(65) Prior Publication Data
US 2014/0019498 A1    Jan. 16, 2014

Related U.S. Application Data

(63) Continuation-in-part of application No. 13/031,628, filed on Feb. 22, 2011, now Pat. No. 8,527,549.

(60) Provisional application No. 61/603,910, filed on Feb. 27, 2012, provisional application No. 61/306,578, filed on Feb. 22, 2010.

(51) Int. Cl.
*G06F 7/00*      (2006.01)
*G06F 17/30*     (2006.01)

(52) U.S. Cl.
CPC ...... *G06F 17/3007* (2013.01); *G06F 17/30082* (2013.01); *G06F 17/30067* (2013.01); *G06F 17/30194* (2013.01)
USPC ........................................................ 707/827

(58) Field of Classification Search
None
See application file for complete search history.

(56) References Cited

U.S. PATENT DOCUMENTS

| | | | |
|---|---|---|---|
| 5,999,622 A | 12/1999 | Yasukawa et al. | |
| 6,438,235 B2 | 8/2002 | Sims, III | |
| 6,880,081 B1 | 4/2005 | Itkis | |
| 8,745,384 B2 | 6/2014 | Persaud et al. | |
| 2006/0064383 A1 | 3/2006 | Marking | |
| 2007/0083575 A1* | 4/2007 | Leung et al. | 707/205 |
| 2007/0143459 A1 | 6/2007 | Batteram et al. | |
| 2010/0257142 A1* | 10/2010 | Murphy et al. | 707/681 |
| 2011/0016311 A1 | 1/2011 | Durand et al. | |
| 2011/0131335 A1 | 6/2011 | Spaltro et al. | |
| 2011/0197280 A1 | 8/2011 | Young et al. | |
| 2011/0314356 A1 | 12/2011 | Grube et al. | |
| 2012/0042162 A1 | 2/2012 | Anglin et al. | |
| 2012/0185437 A1* | 7/2012 | Pavlov et al. | 707/652 |
| 2013/0042106 A1* | 2/2013 | Persaud et al. | 713/165 |
| 2013/0185229 A1* | 7/2013 | Naga et al. | 705/418 |

* cited by examiner

*Primary Examiner* — Uyen Le
(74) *Attorney, Agent, or Firm* — Oren Reches

(57) ABSTRACT

A method for file management, the method may include: calculating, by a management server that is located within a cloud computing environment, signatures of multiple files that are stored at multiple storage entities; and finding, by the management server, groups of similar files out of the multiple files, wherein the finding is in response to similarities between signatures of the multiple files; wherein the multiple storage entities comprise at least a first storage entity that is managed by a first management entity and a second storage entity that is managed by a second management entity that differs from the first management entity.

25 Claims, 22 Drawing Sheets

| |
|---|
| Deleting the file from the storage service 1660. |
| Calculating each encryption key in response to a file segment signature associated with a file segment that is encrypted by the encryption key 1662. |
| Associating with the multiple encrypted file segments the multiple file segment signatures 1664. |
| Flagging the encrypted file as being encrypted 1666. |
| Flagging the encrypted file as being encrypted by altering a type of the encrypted file 1668. |
| Exposing the encrypted file to a user of the management server through an interface of the storage service 1670. |
| Separating (during the segmenting) between text content of the file and image content of the file 1672. |
| Preventing the segmenting, the calculating and the encrypting of the file if the file has been modified by a user of the storage service during a predetermined period from a moment of the retrieving of the file by the management server 1674. |
| Preventing the deletion of the file if the file has been modified by a user of the storage service during a predetermined period from a moment of the retrieving of the file 1676. |
| Finding (during the segmenting) initial file segments by applying a first segmentation process; and defining each file segment as comprising multiple initial file segments 1678. |
| Finding the initial file segments by applying at least one process out of Rabin fingerprint process and cyclic redundancy code (CRC) process 1680. |
| Using segmentation parameters for segmenting a file associated with a certain user and using different segmentation parameters for segmenting another file that is associated with another user that differs from the certain user 1682. |

FIG. 16

| |
|---|
| Using encryption parameters for encrypting a file associated with a certain user and using different encryption parameters for encrypting another file that is associated with another user that differs from the certain user 1684. |
| Using segmentation parameters for segmenting a file associated with a user of a certain group of users and using different segmentation parameters for segmenting another file that is associated with another user of another group of users 1686. |
| Using encryption parameters for encrypting a file associated with a user of a certain group of users and using different encryption parameters for encrypting another file that is associated with another user of another group of users 1686. |
| Adding a user identifier to each file segment. The user identifier identifies a user associated with the file 1688. |
| Associating identical file segments with identical encryption keys 1670 |
| Retrieving the file from the storage service, encrypting the file by the management regardless of a decryption applied by a storage service that stores the file 1672. |
| Segmenting the file by the file management server while applying a second de-duplication policy that is defined regardless of a first de-duplication policy applied by a storage service that stores the file 1674. |
| Retrieving the file from a dedicated folder that is allocated for files to be encrypted 1676. |
| Creating a new folder for files to be encrypted, wherein the folder is exposed to the user 1678. |
| Retrieving the file form a dedicated folder that is allocated to files to be encrypted 1680. |
| Flagging the encrypted file as being encrypted 1682. |
| Changing a type of a file to a type that is indicative of the encryption of the file 1684. |
| Sending the file to a cache memory before starting the segmenting, the calculating, and the encrypting 1686. |

| |
|---|
| Segmenting only the text content of the file and preventing a segmentation of a single image of the file 2330. |
| Replacing at least one file of a group of similar files by a more updated file of the group of similar files 2332. |
| Deleting most files of a group of similar files based upon usage patterns of multiple files of the group of similar files 2334. |
| Maintaining a most updated file of the group of similar files 2336. |
| Detecting files the belong to the group of similar files based upon the signatures of the files 2338. |
| Monitoring a usage of the multiple files 2340. |
| Generating a history of usage of files that belong to a group of similar files 2342. |
| Determining that different files of a group of similar files are either a same file or different version of the file, and generating a history of usage of that file 2344. |
| Enforcing a storage policy on a first file of a group of similar files based upon a compliance of a storage of a second file of the group of similar files with the storage policy 2346. |
| Defining a policy on a first file of a group of similar files based upon the policy of a folder of a second file of the same group of similar files. The policy may be a file access policy 2348. |

FIG. 23

SYSTEM, METHOD AND COMPUTER READABLE MEDIUM FOR FILE MANAGEMENT

RELATED APPLICATIONS

This application claims priority from U.S. provisional patent Ser. No. 61/603,910 filing date Feb. 27, 2012, this application is a continuation in part of U.S. patent application Ser. No. 13/031,628 filing date Feb. 2, 2011 which in turn claims priority from U.S. provisional patent Ser. No. 61/306,578 filing date Feb. 22, 2010, all patent applications are incorporated herein by reference.

BACKGROUND OF THE INVENTION

The advances and reduced costs of network connected mobile devices in recent years have brought a dramatic change in user behavior. The typical user owns multiple personal devices ranging from desktop and laptop computers, notebooks, tablets, smart phones and electronic books. Consequently, there is a growing need to share data among devices, as well as to guarantee its availability despite the fact that devices may be turned off, disconnected and replaced. The penetration of such technology is rapidly increasing in organizations of all sizes. As a result, users are mixing enterprise files, documents and applications together with their personal media.

To this end, the use of cloud-based storage for sharing information between different devices and also among group of users has become a standard. Many consumer commercial offerings such as Dropbox, Box, iCloud, Google Drive and Sugarsync have gained widespread user popularity.

These services offer cloud-based storage that is connected to the devices through apps or through a browser interface. The apps present to the user a directory structure of files organized in folders similar to the appearance of native application such as MS Explorer. In certain operating systems (Windows, Apple OS X) the folder are accessed via the native file browser application. The folders on the device are synchronized with the storage on the cloud and therefore maintain a coherent file and directory state and view across all devices. In certain cases (e.g. Sugarsync) the files are uploaded to the cloud but are not necessarily automatically synchronized to all devices.

In addition to the web-storage services, there is a parallel trend of uploading unstructured data, in particular company documents, to SaaS (Software as a Service) services. New cloud-based enterprise application such as Salesforce.com, Success Factors, and Box, and consumer-based applications such as Google Docs and Gmail, are essentially independent document repositories. These new services have caused a major migration of documents from the corporate storage to web-based SaaS.

FIG. 1 illustrates enterprise based services 20 such as Salesforce 21, Jive 23 and Box 24 and others (such as 22), consumer based services 10 such as Dropbox 13, Gmail 11 and others 12, that are accessed by a enterprise system 30 that includes a database 31, access control, DLP (Data Loss Prevention), DMS (Document Management Service) and analytics modules 32-35.

This trend has caused several major problems.

a. The cloud storage resides outside the enterprise storage and management systems. It is impossible for IT managers to understand what type of data is placed in these services, track the content evolution/changes, police the access and usage of the content and prevent misplacement, duplication and unauthorized access. There may be certain organizational data that is not allowed on some or all of these services. Finally, the consumer-oriented services are easy to break-in using Phishing or password breaking, and have sharing capabilities that may cause enterprise data to be shared by mistake with unauthorized parties (inside or outside the organization).

b. Cloud storage is usually implemented as a data center level storage and therefore is expensive compared to the on-device storage. 2011 technology and prices have resulted in a 1 TB of storage for a typical home entertainment system or desktop computer, and 32 GB for a typical smart phone or a tablet. Similarly, within organizations, the data owned and shared by an employee within organization file systems and current content management systems offer even larger amounts of storage. In comparison popular cloud storage services typically offer only 2-5 GB of storage for free. Consequently, there are several orders of magnitude difference between the quantity of storage that is used and addressed by the user and the reasonably priced cloud storage solution that can be offered to that user. Even when the user does not wish to access all addressable storage but only "relevant" topical material, the current solutions are static and manual. The user needs to select which file he wants to share and move them to the cloud storage directory. This may lead to situation that the data the user would like to access is not available online.

SUMMARY OF THE INVENTION

According to an embodiment of the invention there may be provided a method for file management, the method may include: calculating, by a management server that is located within a cloud computing environment, signatures of multiple files that are stored at multiple storage entities; and finding, by the management server, groups of similar files out of the multiple files, wherein the finding is in response to similarities between signatures of the multiple files; wherein the multiple storage entities comprise at least a first storage entity that is managed by a first management entity and a second storage entity that is managed by a second management entity that differs from the first management entity.

The first and second management entities may be cloud storage services.

The method may include calculating, for each file of the multiple files, a signature of the file that is in response to a content of multiple segments of the file.

The method wherein the calculating of the signature of the file may include segmenting the file to provide the multiple segments of the file, and calculating a unique file segment signature for each segment of the file based upon a content of the segment of the file, wherein unique file segment signatures of different values may be calculated for segments of the file that differ from each other by content.

The method may include generating the signature of the file by compressing the unique file segment signatures to provide compressed file segment signatures and combining the compressed file signatures to provide the signature of the file.

The compressed file signatures may be at least fifty percent smaller than the unique file segment signatures.

The unique file segment signatures may be at least thirty eight bytes long.

The unique file segment signature may be at least forty eight bytes long.

The method wherein the compressed file signatures may be at least eighty percent smaller than the unique file segment signatures.

The compressed file signatures may be at least ninety percent smaller than the unique file segment signatures.

The compressed file signatures may be non-unique.

The segmenting may maintain a separation between image content of the file and text content of the file.

The method may include segmenting only the text content of the file and preventing a segmentation of a single image of the file.

The method may include replacing at least one file of a group of similar files by a more updated file of the group of similar files.

The method may include deleting most files of a group of similar files based upon usage patterns of multiple files of the group of similar files.

The method may include maintaining a most updated file of the group of similar files.

The method may include detecting files that belong to the group of similar files based upon the signatures of the files.

The method may include monitoring a usage of the multiple files.

The method may include generating a history of usage of files that belong to a group of similar files.

The method may include determining that different files of a group of similar files may be either a same file or different version of the file, and generating a history of usage of that file.

The method may include enforcing a storage policy on a first file of a group of similar files based upon a compliance with the storage policy of storage of a second file of the group of similar files.

The method may include defining a policy on a first file of a group of similar files based upon the policy of a folder of a second file of the same group of similar files.

The policy may be a file access policy.

The at least one management entity may be an enterprise file system.

Additional embodiments of the invention include a non-transitory computer readable medium that may stores instructions that may cause a system to execute any or all of the methods described above, including any stages-and any combinations of same. The non-transitory computer readable medium may store instructions for calculating, by a management server that is located within a cloud computing environment, signatures of multiple files that may be stored at multiple storage entities; and finding, by the management server, groups of similar files out of the multiple files, wherein the finding is in response to similarities between signatures of the multiple files; wherein the multiple storage entities comprise at least a first storage entity that is managed by a first cloud storage service and a second storage entity that is managed by a second cloud storage service that differs from the first cloud storage service.

Additional embodiments of the invention include a system that is arranged to execute any or all of the methods described above, including any stages-and any combinations of same. For example, the system may include a management server that may include a signature calculator for calculating signatures of multiple files that may be stored at multiple storage entities; and a similar group locator for finding groups of similar files out of the multiple files, wherein the finding is in response to similarities between signatures of the multiple files; wherein the multiple storage entities comprise at least a first storage entity that is managed by a first cloud storage service and a second storage entity that is managed by a second cloud storage service that differs from the first cloud storage service. The management server includes at least one hardware module or component.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 15-23 illustrate methods according to various embodiments of the invention.

Figure 1:
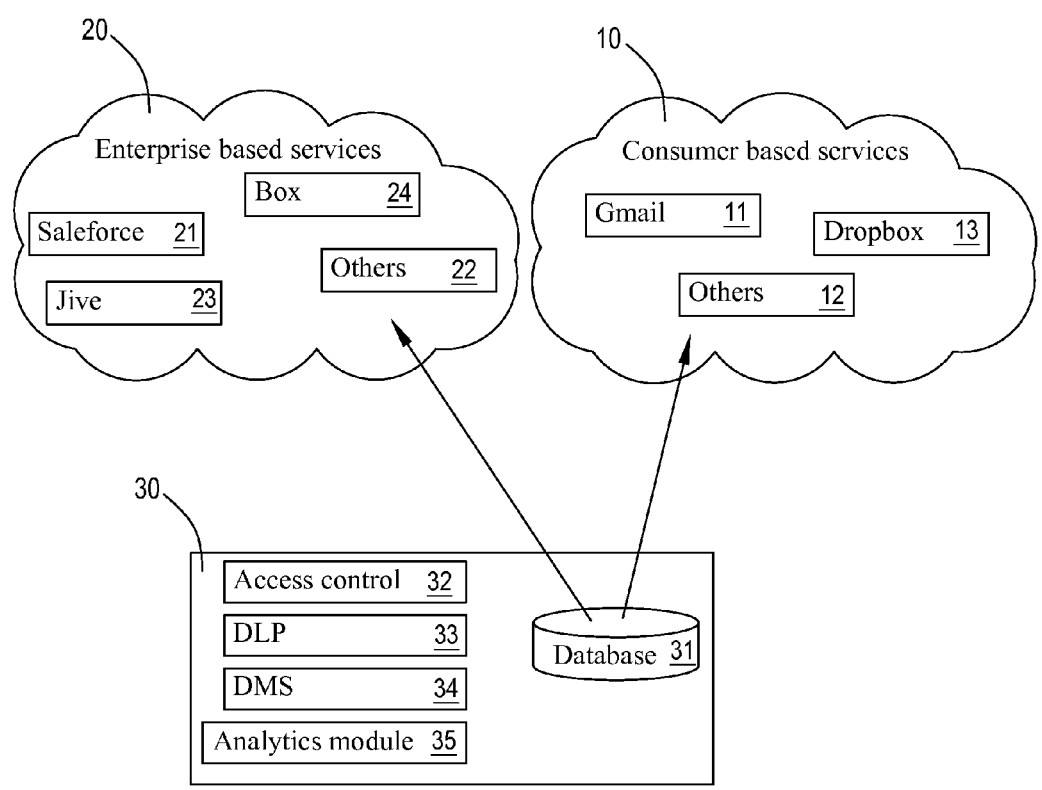
FIG. 1 illustrates a prior art cloud computing environment.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details may be set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

According to various embodiments of the invention, methods, computer readable media and systems are provided for extending existing/third-party cloud storage services, without changing their basic architecture. The methods, computer readable media and systems may support all the services of the cloud-based virtual file system described in U.S. patent application Ser. No. 13/031,628 filling date Feb. 22, 2011, as well as several new features.

The basic set of new user services may include:
a. Automatic upload of relevant materials/documents to the cloud storage based on its newness and usage patterns, allowing the system to predict which material should be on-line. This allows the user to have their "working set" files dynamically and adaptively be placed in the cloud. The automatic upload procedure tracks user's file-related activities on local storage that is not connected to the cloud, such as the internal file system or the personal desktop. Such activity includes user's file access and file modifications. The activity may also include activity of other users on files with the same or similar content, indicating that this content maybe later required by the user. Such recently accessed or updated files will be copied or linked to the cloud storage, according to priorities that take into account the popularity of the content and the availability of free storage space on the storage service. Example may include, Microsoft Windows "recent documents". Such files will become automatically available and accessible to the users through the cloud-based service.
b. The ability to free space on the cloud storage so that more relevant material can be placed there. Files which are removed will be stored back on other means of storage. This is done by removing data that is inactive not only for a particular user but also by observing group and collaborative activities. This complements the previous mechanism to free cloud storage space to place more relevant data. It makes the cloud storage mechanism an effective cache with a replacement policy. Similar to the automatic upload procedure that tracks recent file-related activities on storage which is not on-line, this storage freeing procedure monitors the cloud storage service for files which are inactive. Inactivity scores may be combined with other users who have files with the same or similar content. Files which are considered to be unused for a very long time may be candidate for removal. Other considerations for removing files which were not accessed are the availability of several newer versions of the same files. The file removal procedure will include a user-prompting phase where the user will authorize the removal and may select the backup storage location.
c. The ability to browse, create, load, copy, move and store folders and files in remote devices that are not placed within the small "window" of the cloud storage directory. This gives the user full access to any data residing on any device as long as the device is powered on and connected to the network.
d. The ability to encrypt sensitive documents stored in the cloud service and to securely share these encrypted files with authorized partners while preventing others from decrypting them. The encryption could be done for selected documents, designated folders and pre-configured folders.

Similarly the new set of features may assist the administration of the organization (termed IT) as well as the users in gaining new management and security functions. This should be done across multiple services in a seamless way.

These include:
a. Accessing the complete user file and folder structure by browsing the web service account using either a standard user interface (usually web interface) or an Application Interface (API) such as WebDAV standard or a proprietary one with enhanced capabilities. The API also allows the IT to program additional functionalities such as document search, file backup, file check-in and check-out from an internal document system, for retaining organizational compliance or legal retention and backup regulations.
b. Tracking the users' usage of the data through such interfaces.
c. Tracking the evolution and distribution of documents in the system from their creation, name and content modifications (including encryption and decryption), format changing (e.g. MS Office versions, conversion to PDF or text, etc.), movement across the folders, movement across services and ownerships, copying, sharing and email distribution.
d. Comparing the cloud services accounts' content against the content of the enterprise's internal storage repository, as well as against each other, to detect files which are not permitted or misplaced in the wrong directories inside the cloud accounts. This is done by extracting file signatures (usually MD5) or de-duplication segment signatures from both the web account as well as from internal repositories of enterprise data and the policy that is applied to them (e.g., LDAP or Microsoft Active Directory) as well as their location within the entire system.
e. Encrypting the content of selected folders (or all folders) thus making them secure. New non-encrypted files are replaced in the system by encrypted ones. When these files are accessed by the user they will be encrypted and read by the user using a decryption mechanism available on his device (PC, laptop, notebook, tablet, smart phone etc.). Alternatively, these documents can be accessed through an API that is part of the Sookasa service which encrypts the document on-the-way from the device to the cloud service and decrypts in the opposite direction.

f. Using the encrypting mechanisms described above, the content of the web storage site will be protected from intruders who access the account through Phishing or password breaking. It will also be protected from users who gain access to the account through sharing but are not allowed access to the material. Similarly it can be accessed by authorized partner who will obtain the decryption ability from the system.

g. Encryption poses tremendous challenges for the storage and communication of the data. Modern systems extensively use de-duplication techniques, based on the common data across files, for both saving storage space and communication bandwidth (traffic redundancy elimination). The fact that two almost identical files become completely different after traditional encryption, eliminate the ability to exploit file similarity for encrypted data. In this document we describe a novel de-duplication friendly encryption methodology that preserves the similarity between files even after encryption. This similarity can be used by the existing web-storage and communication/synching applications (e.g. used by Dropbox, Box, Riverbed, Cisco WAAS, DataDomain) to save storage and communication. While maintaining file similarities is essential for effective usage of storage and communication bandwidth, it may be a requirement to constrain this feature for a specific user, account or different organizations. We will also describe an encryption methodology that maintains similarities only within a given domain.

The System Architecture

We assume that according to an embodiment of the invention there is provided a system that may support a cloud storage service such as Dropbox, Box, Sugarsync or a web-based storage system such the one offered by Amazon S3 or EMC. It can also support document repositories included in SaaS services such as Salesforce, Success Factors and Jive. Without loss of generality we can also utilize systems which are not traditional storage depositories. For example Google Docs, Office 365, Evernote and even cloud-based email accounts such as Gmail have the ability to create draft documents, create folders and filters and send mail to another email account. While there are many different user interfaces and APIs provided by the different cloud storage services, we assume that there is a clear way in each of these services to upload a file, erase a file and upload control information using the writing and reading of standard files (e.g. text or binary files).

Figure 2:
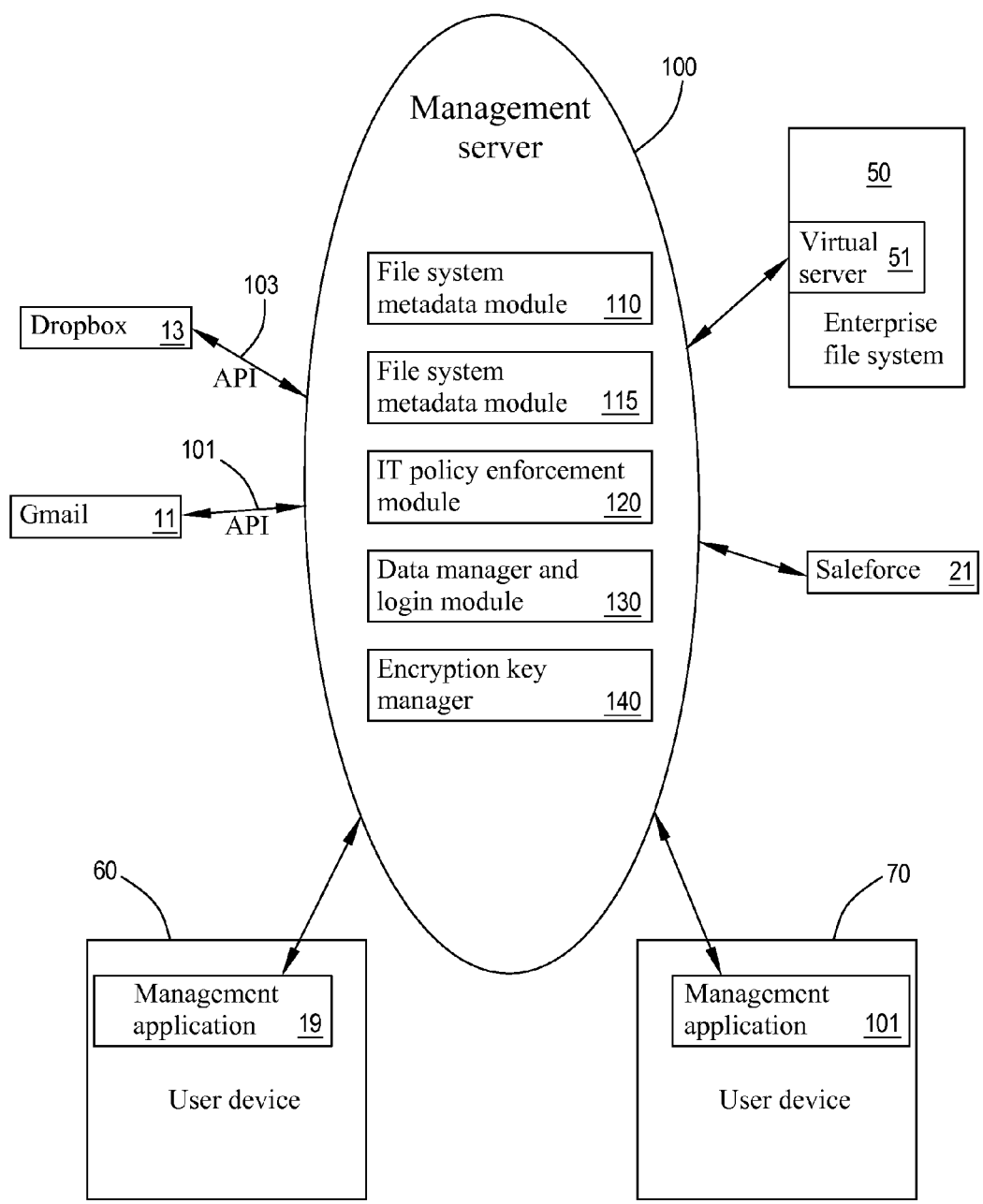
FIG. 2 illustrates a management server within a cloud computing environment according to an embodiment of the invention.

FIG. 2 illustrates a management server 100 (such as a Sookasa server) at the center of the system. It is connected to consumer-based file repositories (e.g., Dropbox 13, Gmail 11, or others such as Evernote) through Application Interfaces (API) 101 and 103 or through web access, similar to the way that a browser interacts with a web server, accessing stored files through interfaces such as FTP, Secured FTP (SFTP) or WebDAV. Without loss of generality we will mainly mention WebDAV. Using similar methods the Management server also connects to business file repositories that are an inherent part of SaaS services such as Salefsorce.com 21, Success Factors, Chatter and Jive. Management server 100 can access user accounts by sharing user credentials or being authorized by the user or the administration to access such accounts. Moreover, Management server can also access file repositories (such as enterprise file system 50) within the organization using a software agent (topically a virtual server 51) placed within the organization. Such repositories can be the organizational file system (e.g. CIFS, NFS), internal document management systems (e.g. SharePoint. Documentum) and other internal repositories that are part of the enterprise applications.

The Management server 100 can communicate with user devices 60 and 70 that host management applications 101 such as management applications. The management server 100 is illustrated as having a file system metadata module 110, an IT policy enforcement module 120, a data manager and login module 130 and an encryption key manager 140.

The management server 100 can be regarded as a broad term to describe the complete software system which is responsible for encrypting files in the cloud and enforcing secure access to these cloud files by providing the right decryption keys to the right users. It may include various software and/or hardware components that may include or may be arranged to: (i) provide connectors to various consumer file repositories, (ii) store information about these file repositories (115), (iii) analyze and encryption of files, (iv) secure storage and retrieval of encryption keys (140), (v) provide access policy configuration for secure file access (120), (vi) enforce access policy for secure file access (120, 130) and (vii), report on file access usage and devices being used for access.

The management server itself can be run on the cloud and implemented in various programming languages, for example: Python code running on Heroku or Java based servers running on Amazon EC2. For storing the data such as file metadata, keys, access tables and user profiles, a data a persistent store can be used example: Postgres (Relational Database) and/or Redis (Key-Value Store)

The figure also illustrates a file System metadata module (115). The Sookasa service fetches information about all the files residing in consumer file repositories. In addition to the file name the service also discovers a lot of information about the file which is commonly called metadata.

Examples of metadata are:

1. Name of the file, and its type, e.g. CostaRica.jpg or sales-document.docx.
2. Location of the file in the consumer repository e.g./Photos/travel/CostaRica.jpg which means a file called CostaRica.jpg residing in the Photos folder under travel subfolder.
2. Created Date and Creator e.g. 5:10 pm 10 Oct. 2012 by User John Doe.
3. Modified Date and Modifier e.g. 6:30 pm 15 Oct., 2012 by User Jane Doe. This can be a list of modifications.
4. Mime-Type—The content type of the file e.g. image JPEG.
5. Team—The name of the team (a logical grouping of users).
6. Company—The name of the company (another logical grouping).
7. Checksum—A cryptographic fingerprint which uniquely identifies a file.
e.g. SHA-512 Algorithm which gives a 32 byte digest.
8. The file is publicly shared or it is privately shared with users X, Y and Z.
9. A description of the file e.g. "Picture taken during my travels in Costa Rica".
10. Last Viewed—The last time someone viewed the file.
11. Revision or Version—Indicating the current version of the file.
12. De-duplication data that includes a list of chunks, each described by the length of the chunk and its signature.

The metadata module can be implemented by a combination of application code and a persistent store e.g. Python code and a relational database and an in-memory store Memcache/Redis for enhanced performance.

IT Policy Enforcement Module (120). The Sookasa service encrypts files in consumer file repositories. Different IT departments will want different policies for access to these secure files. Users in a company may be organized in further groups and each group may have different policies. Each user may use multiple devices to access these file repositories e.g. Dropbox accessed by an iPhone/iPad App or a Windows Laptop. The admin interface allows for an administrator to define access policies. This is done through a web browser interface to the module. Once this policy is defined it will be enforced through application interfaces (API). A HTTP based API will be available which can be used by a Sookasa client application or any third-party application to request access to a secure file. The module will check the credentials of the requesting application user and the file to determine if access is to be granted.

Data Manager and Login Module (130). An application interface (API) will be provided so an application can request access to the secure file on behalf of the user. For example on the iPhone a Sookasa application can handle a request to open a secure file. On invocation the Sookasa application will authenticate the user with the login module and then request access to the secure file.

Encryption Key Manager (140). The encryption key manager generates, stores and retrieves encryption keys. An encryption key is used to encrypt a cloud file (or chunks in case of very large files). For example an AES 256 byte key can be used to encrypt a file. This AES key needs to be stored so it can later be retrieved to decrypt the file. The key is stored in a secure manner in a persistent storage. For example Sookasa will store the key in an encrypted form in a relational database.

Figure 13:
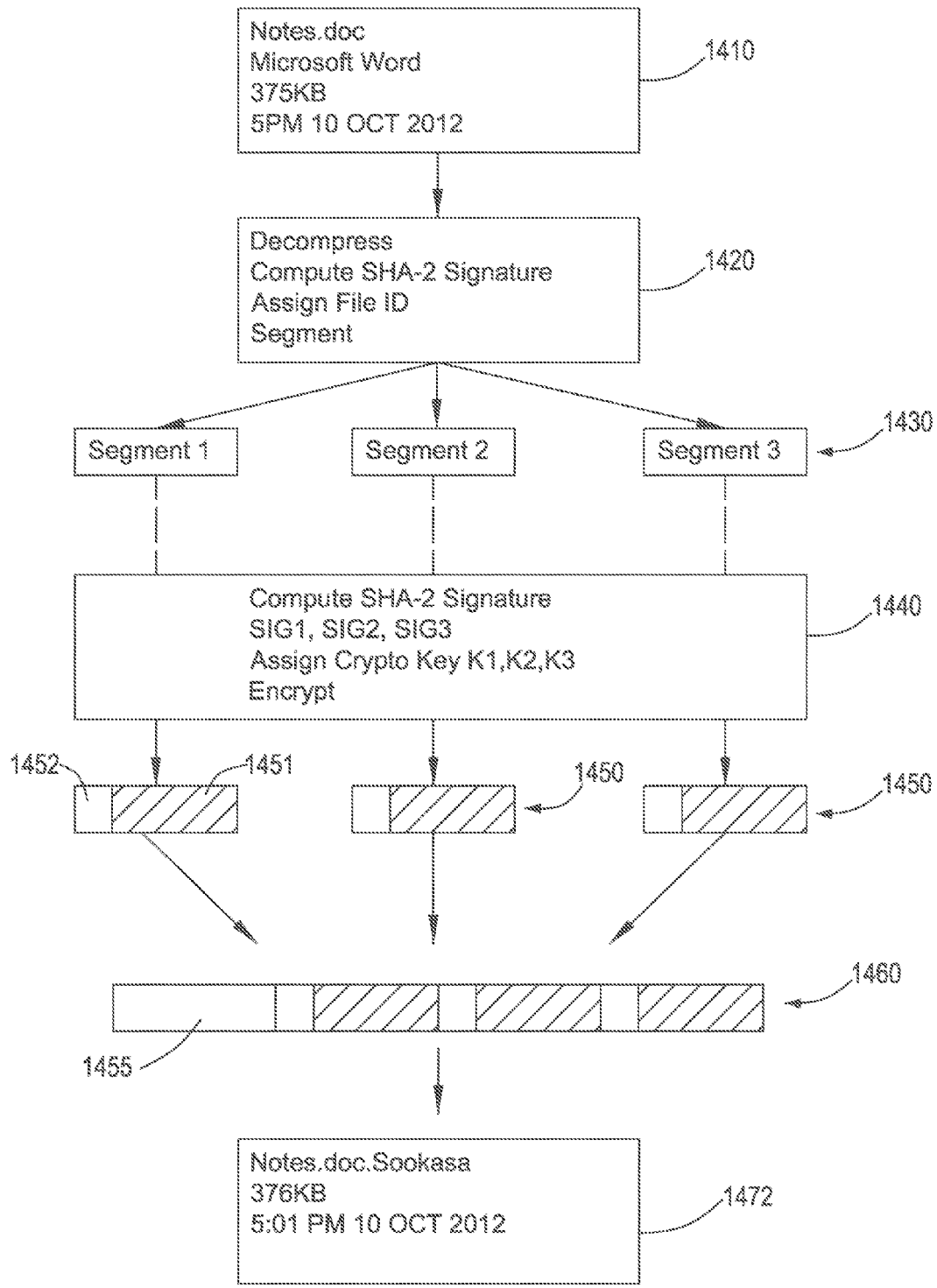
FIGS. 13-14 illustrate a file segmentation process and metadata according to various embodiments of the invention.

FIG. 13 illustrates the architecture of the management server 100 and its environment according to an embodiment of the invention.

The management server 100 may provide a SaaS solution layered on top of one or more cloud storage solutions to monitor, track, log and secure unstructured business content in the cloud, stored at different file repositories operated by many vendors. The management server and the management application may also enables cross-vendor file tracking, comparison and movement, as well as user access to files from one of the vendors user interfaces (UIs) to other vendors.

The management server 100 provides user management, API access (as well as API feed) to cloud storage services such as Dropbox and Box, metadata for all the files/folders contained in these services and device APIs for the management application on user's devices to communicate with the server. The management server 100 may also provide file and folder encryption services to the user. It serves as the secure key server and provides file decryption keys and permissions to the Management Apps on devices. It also allows the extraction of file Metadata from files including their cryptographic signature.

The management application (or a management web application) may allow users to register for management services, to login and manage their account, to create/manage collaboration teams for secure file and folder sharing. It also allows for a full view of the user files and folders across all services.

The management web application may also provide a hierarchical administrative dashboard to a hierarchy of team administrators to manage team policies and permissions, and to track team members' usage of the cloud storage services.

Management applications on desktops and mobile devices are invoked when the file types for which they are registered are opened by the user locally or from cloud storage applications. These applications then seamlessly access the management server to fetch the encryption keys from the server as needed to decrypt the secure file before opening the file for the user.

Other file types are used to create pointers to files, which can be stored in cloud storage services and are uploaded by the Management applications through a request to the Management server or directly from the cloud service.

The management server 100 may have the following functions: user management, cloud service API, metadata, device API and key management.

The management server may use the Django/Python (Django 1.4 and Python 2.7) web application framework on top of which each of the components are instantiated. A database such as a PostgreSQL database may be used for the user and team information with an optional cache layer (based on Redis or Memcache) to optimize database accesses.

Redis may be used for implementing a key-value store for keeping the file/folder metadata. This allows the management server to handle/authorize the key requests from the devices very rapidly. Redis also provides the mechanism to create message queues for inter-module communication. Celery and Celerybeat components may provide facility for scheduling and managing multiple threads.

The management server may use standard REST APIs provided by cloud storage services e.g. Dropbox and Box, to periodically discover new and changed user files in the cloud. Additional metadata e.g. file signature, is extracted from these files and stored in the Redis key-value store. Any new files that need encryption are serviced and stored back in the cloud via the appropriate APIs. The management server may also need to access additional file/folder sharing information using the user's cloud account. The management server may provide a similar REST API for third party services in order to upload metadata to the management server.

The management server may provide a REST API for the device apps to communicate with the server as needed to fetch or push appropriate file encryption keys to the device.

The management server may be implemented as a multi-tenant SaaS application hosted in the cloud. The management server components may be instantiated as modules on top of the Heroku Platform-as-a-Service (PaaS) platform (which in turn is hosted on Amazon Web Services).

The management server may be implemented in a modular way with well-defined interfaces between components which allows scaling and hosting different modules independently and outside Heroku as well, e.g. the PostgreSQL DB can be run elsewhere e.g. on AWS to optimize performance. In addition, a caching layer can be added on top of the database backend to increase performance.

Heroku allows the application to scale appropriately by instantiating more "dyno" instances for any of the server component as required. Additional Heroku application modules are also instantiated as needed e.g. mailgun for smtp, stripe for payments, "new relic" for monitoring.

Management web application handling may be implemented using the Django Web Model-View-Template Framework on a standard web server e.g. Apache with a Python backend server which hosts the database model for the users, team owners and teams. The frontend is further enhanced by Jquery/JavaScript and Ajax calls to the server. The data between the server and client app is serialized using JSON (JavaScript Object Notation) format.

Users may sign up for the management service using the web application (and from the device application in the future). Users can create collaboration teams to share secure folders and invite other enterprise users to these teams. The team administrators have a tracking/monitoring dashboard view of all the sharing activity within and outside the team. The team administrator can be configured to approve or deny requests for members outside her team to access secure files inside the team members' secure folder.

The management server may be integrated with Open ID and Microsoft Active Directory to facilitate and simplify provisioning of enterprise users.

The management applications are installed by the users on their desktop computer or their mobile devices. The OS requirements for desktop clients are Windows 7+ or Mac OS X 10.6.8+(Linux desktop support will be added in the future) and these can be downloaded from the management server by the user. The OS requirements for mobile clients are IOS 5+ for iPhones and iPads, and Android 2.3+ for Android phones and tablets. These apps are downloaded by the user from the App Store and Android Marketplace respectively. Updating the installed applications to newer revisions is also supported.

The management application may be registered with the underlying OS to open the encrypted documents with the ".sooksasa" file extension and other file extensions designated for encrypted files and virtual files. These files may be opened from the MS Explorer/OS X Finder or similar file browsers as well as from the cloud service application file browser. When opening an encrypted file from the local file browser, the management application seamlessly hands over the decrypted file to the native application for the file type of the original unencrypted file. When opening an encrypted file from a web-based file browser, the management application seamlessly fetches the file over the network from the management server or from another cloud service over its native API and hands over the file to its native application.

As part of the OS registration, the application also registers management type icons to display encrypted files visually to the user and to show encryption progress for any files or folders that are added to the secure folder of the user. Similarly, virtual files are displayed to show if they are remote or in the process of being fetching.

The Federated Virtual File System (FVFS)

The Management server imports information regarding the files and folders from the various repositories. It can be gathered through browsing the (typically tree) structure of the folders and processing file and folder data or by directly importing metadata that resides within these repositories. The information is captured into a "normalized" metadata description. Examples are described in U.S. patent application Ser. No. 13/031,628.

In addition, other systems can export their file repository information by "pushing" this information to the Management server via a published API. The API specifies how the folder/directory structure is described and how the file information is described as well as extracted. The API may also describe commands that can be invoked against the files or folders from the Management server. This enables new SaaS providers to be managed via the management server.

Metadata field examples:
a. Folder and subfolder lists and hierarchy relations
b. Folder types
c. File lists
d. File information such as: name, type, creator, owner, time of creation-modification
e. File sensitivity confidentiality and usage attributes (confidential, do not distribute, maintain limited number of copies, do not share etc.).
f. File signature including DNA signatures (sequence of segments with their signatures).
g. File ancestry information such as: copied from, moved from, created from, version of.
h. Contextual and visual-based and directory-based identifiers, such as text keywords, context, machine-based classification, logos, extracted from file content. Such information is typically agnostic to file type (e.g. doc, docx, ppt, pdf etc.).
i. Encryption data for encrypted files (key, list of keys, methods)
j. Compression data for compressed files (e.g., compression method, codebook index).

In addition to the information that describes the folders and files, there may be additional information captured as metadata that describes the policy and ownership of the folders and files and how they should be handled. This additional information can be gathered from other sources (e.g. Microsoft Active Directory, LDAP), can be configured and defined on top of the tree and files by both users and administrators and can be created by the system itself by learning user and administrator behavior. This metadata may include for sub-trees, folders and files:
a. Ownership.
b. Access and distribution privileges (by user, group, remote device, enable/disable read, write, copy, move, create modified versions, delete).
c. Encryption instructions and levels (e.g. all files in sub-tree must be encrypted at a certain level).
d. Position restriction (e.g. files cannot be stored on a certain service).
e. Share restrictions and permissions (free for sharing, share only when encrypted, share inside corporate, share within department, no share).
f. Copy control (limited numbers of copies, no copy).
g. File ancestry policy (retain same policy for copies or modified versions).
h. Retention and backup levels.
i. Tracking attributes (e.g., detailed logs).
j. Policing levels attributes (e.g., enforce by deletion, alert IT, report user, log only).

The management server is kept updated about access, changes, and modification to files and folders. These updates are logged at the management server and can be accessed and exported by the administrators. Examples of information parameters that can be tracked and logged:
a. Access, read, write, copy, move, modifications of file and folders events (e.g. time, by whom, by device).
b. Encryptions and decryptions events.
c. Storage usage tracking, by user, device, department.
d. Sharing and unsharing events.
e. Adding SaaS specific apps.
f. Major changes from baseline of user usage, such as content creation, deletion, moving, access to protected and sensitive material, specific device access.

The management server may allow the administrator not only access to its metadata and logs but may also create a "federated physical file system" by allowing users and administrators access to the files in variety of ways. A very simple example is exposing to the IT and the user, a standard file system network interface such as WebDAV, FTP, SFTP that enables download, upload, move and discard operations as well as file/folder name or other property changes. When a request for a specific file operation is invoked the management server acts as a middle-box or "man in the middle" between the user and the repositories and translates the load/upload/change operations to the API used by the management server against the specified repository. The management server may also perform value-added services in the path such as encryption/decryption, traffic de-duplication and compression. It can also serve as a cache to facilitate large information transfers.

Extracting File Features and Policing the Federated Virtual File System

As folder structure and file metadata is extracted and maintained by the management server newly discovered files are uploaded to the management server for additional metadata extraction. As metadata should be kept small in compared to the original file size, there are several important use cases for the metadata being kept at the management server for the operation and management of the federated virtual file system (FVFS).

a. Identifying files which are identical despite file name changes
   b. Identifying files which are similar to each other in the sense that they are content modification of ancestor files
   c. Identifying files that are identical or similar in text and image content despite file type changes (such as conversions from docx to doc or PDF etc.).
   d. Extracting data that identify the sensitivity or corporate confidentiality level of the document. This can includes text keywords, sensitive formats (like credit card or social security numbers, customers and vendor names etc.). It can also include images such as logos.
   e. Extracting data that may help in file search operation, using text/tags based search or one or more document references.

In this invention we will focus on a set of metadata types that will be termed file DNA. These information items can be file type specific or totally type agnostic. A file DNA may include file segment signature—each file segment signature may be associated with a single segment of the file. A file segment signature of a specific file segment can be calculated based upon the content of the file segment.

Figure 3:
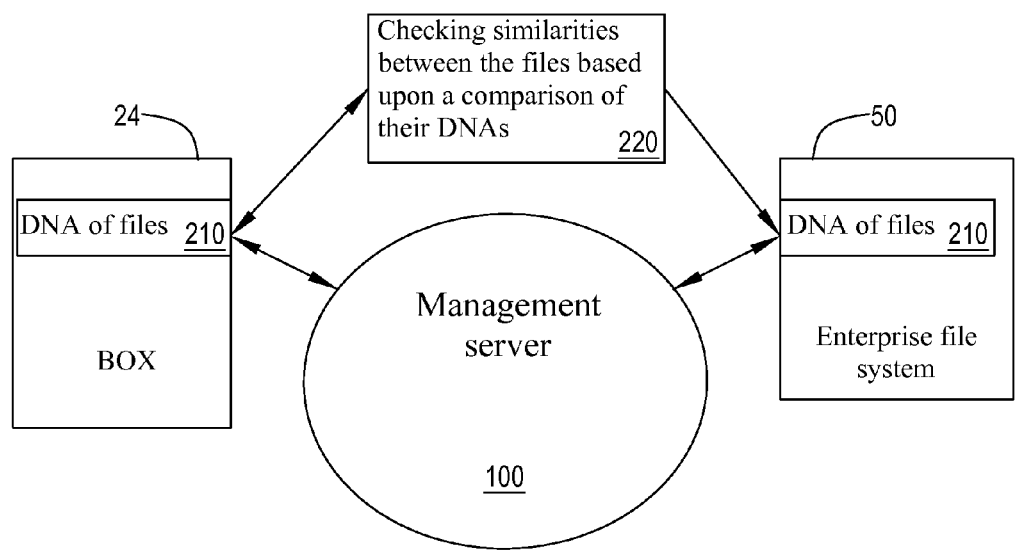
FIG. 3 illustrates a file similarity detection process executed within the cloud computing environment according to an embodiment of the invention.

FIG. 3 illustrates a DNA similarity-based process in which the management server 100 extracts (210) the DNA of files stored in BOX 24 service and in an enterprise file system 50 and checks (220) similarities between the files based upon a comparison of their DNAs.

The file DNA can be extracted by the storage service and reported to the management server. Alternatively, this is done by the management server, looking for new files in the storage services, fetching each new file from the corresponding service to the management server, performing the DNA extraction and erasing the fetched copy after the DNA extraction is completed. In order to save communication and storage, a single fetch operation of a new file from the storage service to the management server can be used not only for DNA extraction but also for other services such as encryption, analytics, virus and malware filtering, archiving and backup to other storage services, and file synchronization between services.

File Similarities

There are several papers that describe different ways to discover and measure similarities between files. These papers may include:

a. U. Manber, "Finding similar files in a large file system", Proceedings of the USENIX Winter Technical Conference, pp. 1,10, 1994.
   b. Andrei Z. Broder, "On the resemblance and containment of documents. In Compression and Complexity of Sequences (SEQUENCES '97), 1997.
   c. Andrei Z. Broder" Identifying and filtering near-duplicate documents", In R. Giancarlo and D. Sankoff, editors, Proceedings of the 11th Annual Symposium on Combinatorial Pattern Matching, number 1848 in Lecture Notes in Computer Science, pages 1-10, Montŕeal, Canada, 2000. Springer-Verlag, Berlin.
   d. A. Broder, S. Glassman, M. Manasse, and G. Zweig, "Syntactic Clustering of the Web", WWW 1997.
   e. N. Shivakumar and H. Garcia-Molina, "Finding near-replicas of documents on the web", WebDB 1998.
   f. Andrei Z. Broder, "Identifying and Filtering Near-Duplicate Documents", CPM 2000.
   g. S. Schleimer, D. Wilkerson, and A. Aiken,"Winnowing: local algorithms for document fingerprinting", Proceedings of the 2003 ACM SIGMOD international conference on management of data (SIGMOD '03), 2003,San Diego, Calif.
   h. M. Rabin, "Fingerprinting by random polynomials", Technical Report TR-15-81, Harvard University (1981).
   i. A. Z. Broder, "Some applications of Rabin", Sequence II (1993).
   j. Athicha Muthitacharoen, Benjie Chen, and David Mazieres, "A low-bandwidth network file system", In Symposium on Operating Systems Principles, pages 174-187, 2001.

Article j describes the first implementation of file de-duplication using the segmenting techniques described in article a. We will use some of the segmenting techniques described in these documents that are based on the application of Rabin Fingerprints (see articles h and i), and A. Z. Broder, "Some applications of Rabin", Sequence II (1993)) or Cyclic Redundancy Code (CRC) over a sliding window along the file and the creation of anchors—segments boundaries, along these files (see FIGS. 6, 7, 8).

Segments are then identified by a cryptographic signature such as SHA-2 or a fingerprint function such as Rabin Fingerprint. Other techniques described in articles b-g show how to dissect the file into "shingles" which can overlap (unlike the segmenting algorithm of articles a and j). If $S_a$ and $S_b$ are the set of segments (or shingles) of files A and B, respectively, the similarity between the two files is defined as:

$$sim(S_A, S_B) = \frac{|S_A \cap S_B|}{|S_A \cup S_B|}$$

It is clear that this metric takes the value 1 when the files are identical and 0 when they have no common segment. The set relationship also defines inclusion and exclusion relationships.

As each file is identified by a sequence of segments each with a unique ID, we can assign a threshold to identify file similarity. Two files are declared similar if the similarity metric is more than a predefined value H.

In addition to file similarities it may be very useful to identify file ancestry or lineage. We define file ancestry as a tree of files where the oldest file is at the top of the tree. Another file B will be defined as a direct child of another file A if:

a. A and B are similar
   b. B is dated after A
   c. There is no file C dated before B such that $sim(S_C, S_B) > sim(S_A, S_B)$ Since a parent file A may have multiple children, this creates a tree structure rooted at the first version of a file, termed the "ancestry tree". Note that such files in a single ancestry tree may belong to different repositories and different users and is not related to the folder tree structure.

Note that while context-free similarities based on segments or shingles is a very useful notion, there are many obstacles to applying such metrics and there is a strong motivation to further refine the notion of file similarities.

Files may also include images which occupy a much larger space than text. Thus, it may be sufficient to replace a single large image or picture to make the two files not similar while in reality they are almost identical. Examples can be a single picture, a logo or a presentation background.

Many modern applications create files that are compressed (e.g. PDF, MS Office 2007 and later). If two files A and B are similar, their compressed versions are usually not similar using the segmenting or shingles metric.

Several simple enhancements to the similarity metrics among such files would be:
  a. Use the uncompressed version of the file. MS Office can usually just be uncompressed by gzip. In such a case the file is built as a directory of sub files where images can be identified.
     i. Use a single signature for each image file no matter how large it is
     ii. Use segmenting or shingling only on the text fields (so also formatting tags will be largely ignored)
  b. Extract the text from the documents using platforms such as Apache Tika or Apache POI (based on Java) and apply segmenting techniques to text only. In this case, one can also compare documents that are stored in different file versions and types such as doc vs. docx vs. PDF.
  c. Use a dictionary histogram of the most popular words. This histogram is built by counting the number of occurrences of each word in the text divided by the word popularity that can be derived from many word popularity study studies such as: (http://en.wiktionary.org/wiki/Wiktionary:Frequency_lists). The word popularity can also be extracted from the storage repository itself. In this case the weight of words like "security" or "Joseph" will be the number of times such word appears in this particular document divided by the number of times it appeared in all documents. Such a histogram is will vary very little between documents which are derived from each other. The histogram may be partial and include, say, the 100 highest weighted words in the document.
  d. Since DNA sequence may be quite long (say a 16 Mbyte file divided to 4 Kbytes segments results in more than 4000 signatures each 128 bits) we note that for similarity purposes signatures can be shorter. This is due to the fact that conflicts in similarity measurements are not significant if they are less than say 1%. Thus it is enough to have 8- or 16-bit signatures. As described later the management server also uses segment (or what we term segment) signatures for file encryption, several DNA segments can be always contained in encryption segments using the same Rabin fingerprinting process for segments but matching a longer string). For example one can use 1 Kbytes DNA segments on the average and 16 Kbytes cryptography segments where these encryption segment anchors are also segment anchors.

Placement Policies based on Similarities and Ancestry Trees

Policies can be defined on documents which are ancestors of other documents. For example inheritance rules can be defined which imply that a policy that is defined on a document that is rooted at an ancestry sub-tree, by its file metadata or its folder metadata can be extended to its sub-tree.

Such policies can include:
  a. Placement in specific directories or shares
  b. Access and sharing permissions
  c. Copy control
  d. Encryption Placement policies violations can be detected. The actions taken upon detecting a policy violation can be one or more of:
  a. Erasing, moving or encrypting files to reverse the violation.
  b. Log the event.
  c. Alert administrators.
  d. Alert users and let them approve the violation or change the policy if needed.

File Encryption and Decryption Across the Federated Virtual File System

As consumer storage services like Dropbox and Sugarsync have security problems in terms of password strength, possible attacks on client apps and mobile devices, exposure of content to the service employees and file/folder sharing mistakes, it may be required to apply a user-based encryption on sensitive documents and corporate folders.

Figure 4:
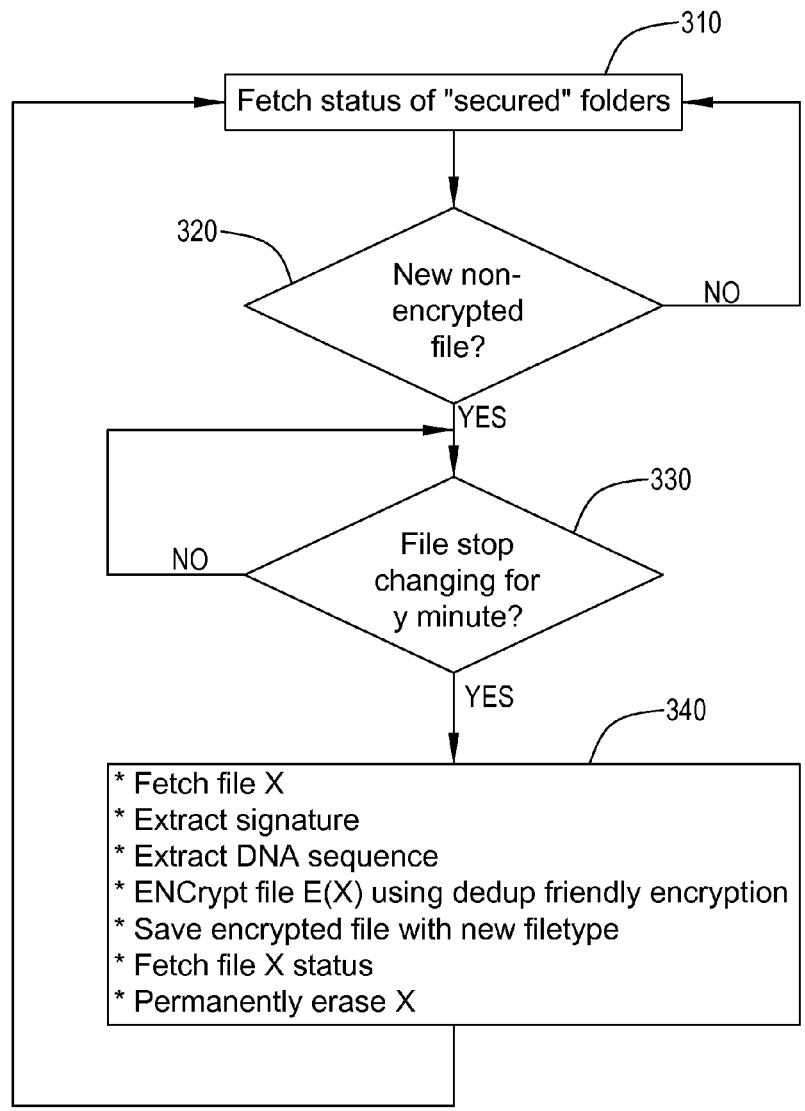
FIG. 4 illustrates a processing of a file within a cloud computing environment according to an embodiment of the invention.

There are two general ways to accomplish such tasks:
  a. Upload and download encrypted files through a different client interface. The management server accomplishes this by enabling user devices to connect to their web storage services through a standard web file access such as WebDAV, FTP and secure FTP supported on Sookasa web server. In this case, the management server serves as a proxy to these file services and a single Sookasa connection may serve multiple web storage instances from the same or multiple vendors.
  b. The user continues to access the files through the device applications provided by the web storage vendor (e.g. Dropbox, Box, Sugarsync and iCloud apps). However in such a case it is not possible to guarantee that files will be uploaded to the storage service in an encrypted form. In this case, the management server monitors the encrypted folders and encrypts unencrypted files as they show up in special directories. FIG. 4 illustrates method 300 for processing a file according to an embodiment of the invention. Method 300 may include fetching (310) a status of "secured" folders—folders that include files that should be encrypted; checking (320) if there is a non-encrypted file in a secured folder—if so checking (330) if the file remained unchanged for a predetermined period (Y minutes), if so—processing the file (340) by fetching the file, extracting a file signature, extracting a DNA sequence of the file to be used as a file identifier, encrypting the file to provide an encrypted file, saving the encrypted file as a new type of file and deleting the file (non-encrypted file).

The rest of this subsection assumes that the second option is selected and that the management server is the entity that encrypts files on the user Dropbox accounts (we use Dropbox as a generic example and the same method can be followed for other web storage services). We also assume that a special management application is uploaded to every device that is needed to decrypt the files and there is also a way to interact with the encryption and decryption facility from the user's web-browser interface.

The management server will encrypt files in the following scenarios:
  a. A file is found in a folder which was designated by the administrator as an encrypted folder. If the file is not changed for a specified period of time after it is uploaded to the management server, its metadata is extracted and it is encrypted using the "friendly encryption method" to be described. The un-encrypted file is then erased from Dropbox.
  b. Same as in (a) but the file resides in a folder with its name implying that all its files need to be encrypted, based on a specific naming convention.

c. Similar to (a) but a specific file was found to be under the encryption policy as defined by the file ancestry tree. This means that the original parent is encrypted and the policy dictates that all descendent files must be encrypted too.
d. A file or folder was designated for encryption by a user using a right-click action against the file browsing functionality on the device.

The encrypted files are stored in the web storage service under a new file type. This file type will have a new icon either installed at the web-service (e.g. Dropbox) or when the management application is installed on the device. In order to permit different icons (such as various Office icons with a lock symbol representing encryption) there may be multiple new types defined such as docx-sks, pptx-sks. One type (.sks) serves as a default for the case where the original type is not known or the system supports only a 3 letter type.

The decryption functionality works as follows:
a. When a file icon of an encrypted file type (Sookasa type) is clicked the operating system will call the management application (Sookasa app) that may be registered as the only application to handle this file type. A check will be done if the required key (encryption key) or set of keys are already cached. If not, the management application will contact the management server, requesting the required decryption token (a key or a set of keys required for the decryption). If the user device is authorized to open this file the token will be provided—additional permissions may be provided to distinguish between read-only and read-write privileges. Tokens also carry caching instructions and can be either permanently cached or have a predefined time to live. Finally, after the management application on the device decrypt the file, it will hand it over to the application(s) that handle the original file types (such as Office application, PDF reader etc.). The application may also depend on the additional permissions provided. For example, the document viewer may be invoked for read-only permissions versus Quickoffice or Pages for read-write permissions. It is noted that that the encrypted file can arrive from multiple services and the management application is called no matter from where the file was opened. For example the file may be an email attachment (Gmail, Outlook, Hotmail) or downloaded by some other application.
b. Selecting the decryption action from right-click operation on a file (or folder) will cause the server to decrypt the file if the user has permission to access the file. If the policy dictates that file must be always encrypted, it will be re-encrypted after a time out as described before in the encryption functions.

A right click selection of the temporary decryption action of a file (or folder) will cause the server to decrypt the file temporarily if the user has a permission to access the file. It will be re-encrypted after a time out as described before in the encryption functions.

Figure 5:
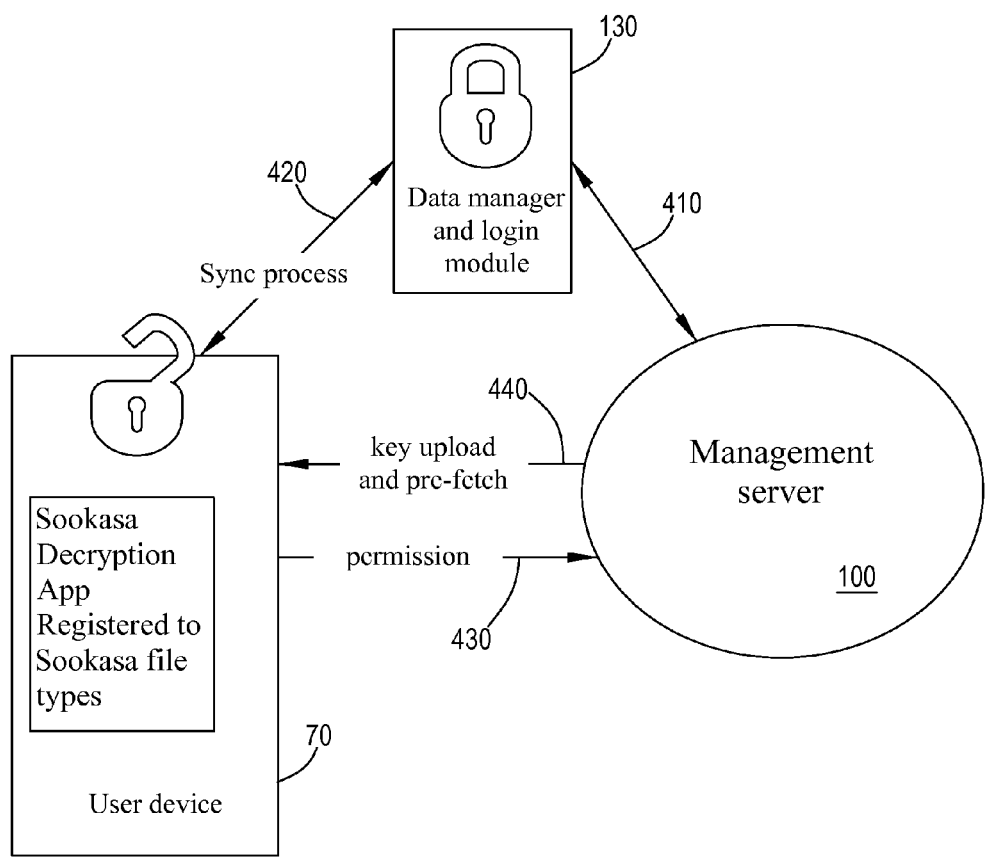
FIG. 5 illustrates a an encryption of a file within a cloud computing environment according to an embodiment of the invention.

FIG. 5 illustrates various stages of an encryption process according to an embodiment of the invention.

A file may be stored in at a storage entity managed by a storage service of a cloud computing environment—such as a Dropbox service 13.

The management server 100 may perform a de-duplication friendly encryption process 410 to provide a modified file (also referred to as an encrypted file). The encryption process is de-duplication friendly because it is performed on segments of the file in a manner that preserves (or induces minimal penalty) on the storage system de-duplication capabilities. As will be illustrated in the FIG. 12—changes of a file may require transmitting only file segments that were actually affected by the changes in the file—and allow the storage system to prevent the re-transmission (de-duplication) of file segments that are already stored at the user device.

The storage service may expose (after performing a sync process 420) the encrypted file to a user device 70. Thus, the encrypted file can be viewed as belonging to a virtual folder that is displayed to a user of user device 70. If the user requests to decrypt the encrypted file the management application 101 can determined if it already has all the required keys for decrypting the encrypted file—and if it is so—the user device 70 can decrypt the encrypted file. If one or more encryption keys are missing—they are requested from the management server 100. The management server 100 may apply an access control mechanism ("permission" 430) and may (or may not) allow the management application to obtain the encryption keys. If it is determined that the user (and user device) have the requisite permissions for the file, then the encryption keys are provided (key upload and pre-fetch 440) to the management application.

The decryption process may require the retrieval of the file (or at least of file segments) from the storage service—and the storage service can apply a de-duplication process that involves sending only encrypted file segments that are not already stored in the user device 70.

De-Duplication Friendly Encryption

Figure 6:
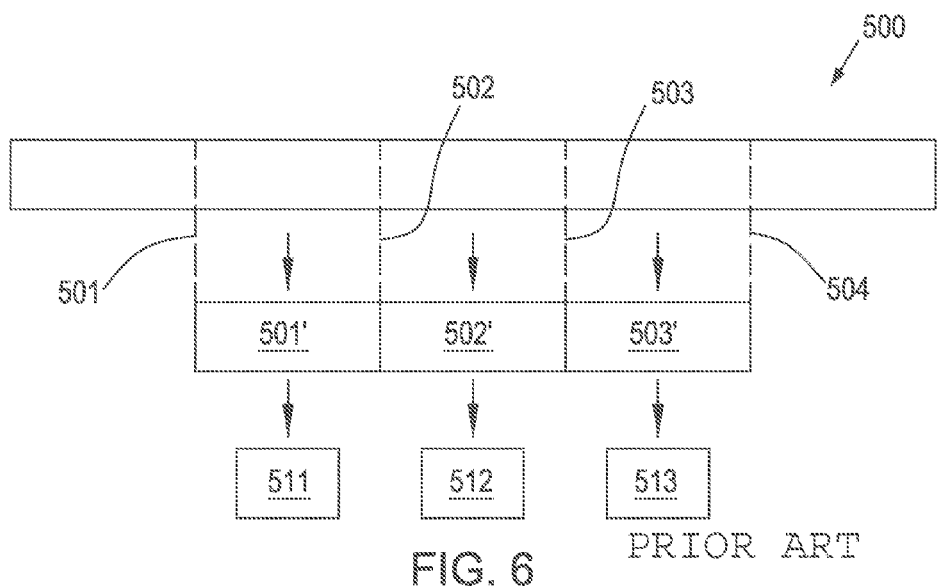
FIGS. 6-7, 8A and 9A illustrate prior art regarding file segmentation and encryption processes.

FIG. 6 illustrates a prior art regarding the segmentation process of file 500 using a Rabin Fingerprinting method. This method applies a 48-bytes sliding window to provide 32-bit long result. Anchors (such as anchors 501-504) are defined at the beginning and the end of the data and whenever the 32-bit long result equals zero. In FIG. 5 three file segments 501'-503' are defined (are delimited by anchors 501-504) and for each file segment a stamp is calculated to provide stamps 511-513. It is noted that a first data segment may start by the end of the file and end with an anchor. The last data segment of the file can start with an anchor and end at the end of the file. It is further notes that the file segments may be referred to as chunks.

Figure 7:
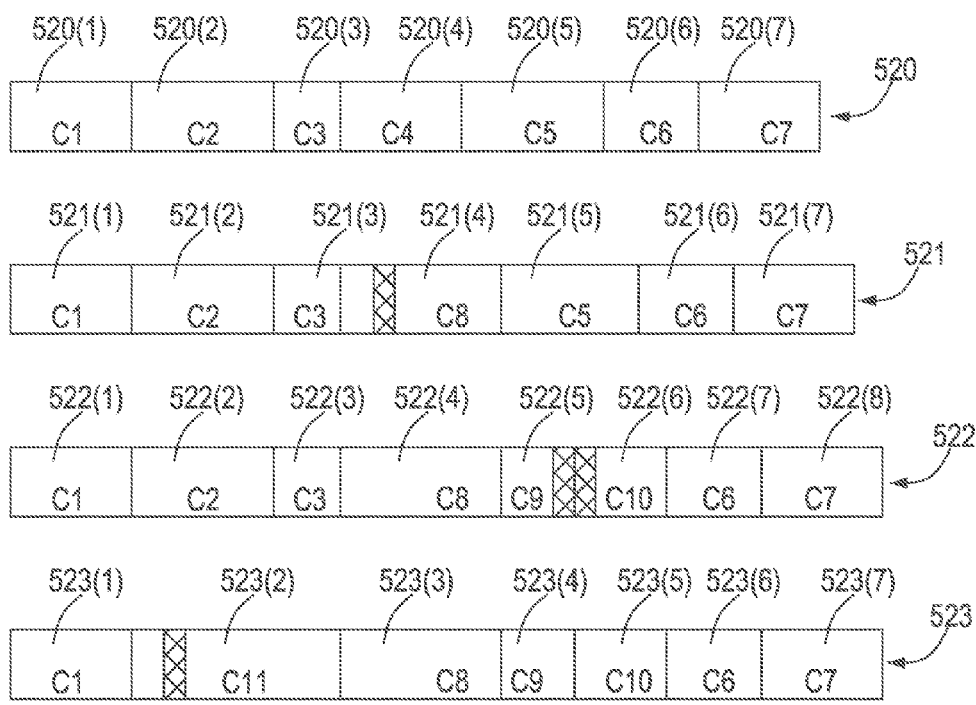

FIGS. 7 and 8 describes a de-duplication mechanism that is commonly used by the web storage vendors to save storage space and to accelerate the synchronization of files between the cloud storage and the cache on the device. As already described, the files are split into segments using a segmenting algorithm, which is based on applying Rabin Fingerprint or CRC on a sliding window. An anchor is created each time that a predefined number of bits or a predefined number of Boolean equations performed on the CRC results becomes zero. For example if it is expected that 13 bits will take a specific single value, an anchor will be created on average every 8 Kbytes. Anchors are used as segment delimiters. Such segmenting methodology is largely immune to bit or word insertion or deletion as each such operation will only change one or two segments but not affect the others. Each segment is finally signed using a strong signature (e.g. SHA-2) with sufficient bits to guarantee its practical uniqueness within the expected storage size.

Now every time a file transfer or storage is required it is first checked if each of its segments already resides in the target system. For the segments which are already known, only the segment signatures need to be sent or stored. This technique is used in many commercial systems that apply storage de-duplication (e.g. DataDomain) and traffic redundancy elimination (e.g. Riverbed, Cisco WAAS). If the system uses compression, this will be performed on each segment separately and not the original file.

FIG. 7 illustrates a file 520 that includes segments C1-C7 520(1)-520(7), and multiple other files that differ from file 520 by one or more segments.

These other files include:

a. File 521 that includes segments C1-C'and C5-C8 521(1)-521(7). In comparison to file 520—segment C4 was replaced by segment C8 that included more information 521(8).

b. File 522 that includes segments C1-C3, C6-C10 522(1)-522(8). In comparison to file 521—segment C5 was replaced by segments C9 and C10 that include more information 522(9).

c. File 523 that includes segments C1, C6-C11 523(1)-523(7). In comparison to file 522—segments C2 and C3 were replaced by segment C11 by adding information 523(8).

Assuming that file 520 is already stored in a user device then the de-duplication mechanism will have to send only file segments C8 of file 521.

Assuming that file 521 is already stored in a user device then the de-duplication mechanism will have to send only file segments C9 and C10 of file 522.

Assuming that file 522 is already stored in a user device then the de-duplication mechanism will have to send only file segment C11 of file 523.

Figure 8A:
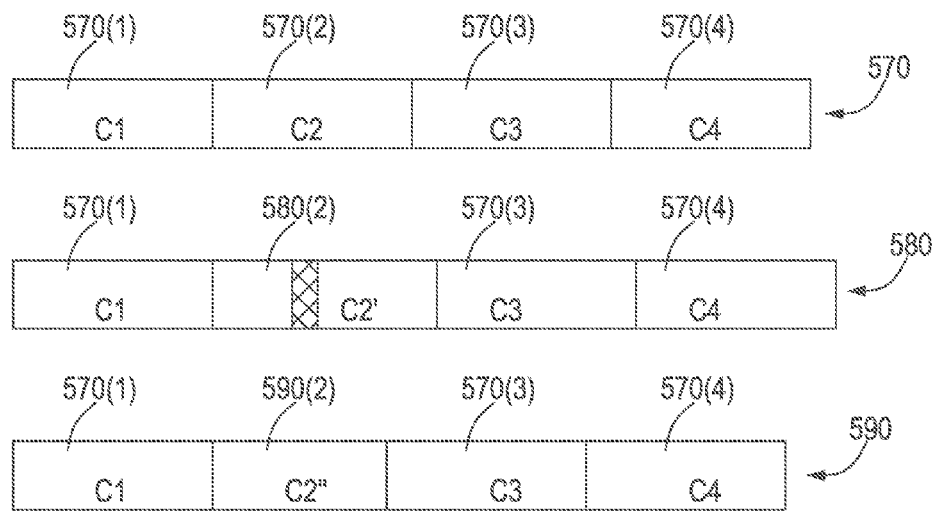

FIG. 8A illustrates a file 570 that includes segment1-segment4 570(1)-570(4), and multiple other files that differ from file 570 by one or more segments.

These other files include:

a. File 580 that includes segment1, segment2', segment 3 and segment 4 570(1), 580(2), 570(3) and 570(4). In comparison to file 570—segment2' 580(2) differs from segment2 570(2) as a result from adding information to segment2.

b. File 590 that includes segment1, segment2", segment 3 and segment 4 570(1), 590(2), 570(3) and 570(4). In comparison to file 570—segment 2" 590(2) differs from segment 2 570(2) as a result from removing information from segment 2.

This de-duplication mechanisms breaks when encryption (and compression) is introduced at a full file level. Both functions practically randomize the data (map the file bit vector to a pseudo randomly selected bit vector of an identical (encryption) or shorter length). Both create completely different files even if the original files were only different in a single bit. Thus, similarity between files (as defined above) is completely destroyed with these features. This is demonstrated in FIG. 9.

Figure 9A:
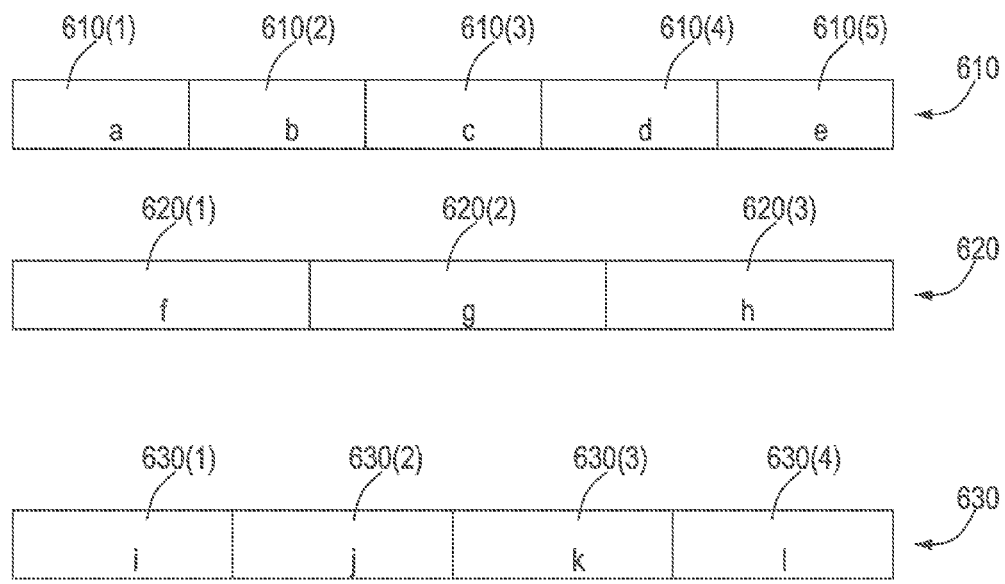

FIG. 9A illustrates encrypted files 610, 620 and 620 that are generated by encrypting files 570, 580 and 590 of FIG. 8A.

File 610 includes segment_a—segment_e 610(1)-610(5).
File 620 includes segment_f—segment_h 620(1)-620(3).
File 630 includes segment_i—segment_1630(1)-630(4).

These segments differ from each other and virtually eliminate any benefit that can be obtained from the de-duplication process.

There is provided a user-level encryption methodology (separate from possible internal service encryption, such as the one applied by Dropbox at the Amazon S3 service) in which the native de-duplication in systems like Dropbox, Box or any other storage service, will be able to use (segmenting based) de-duplication for elimination of redundancy in their storage and communication with remote agent (file synchronization with mobile client cache).

The idea is that instead of encrypting the entire file, we use a user-level segmenting algorithm termed segmentation algorithm, split the files into user level segments that are independent of the native de-duplication used by the cloud storage system.

Segments are potentially compressed, signed (using a hash function) and then encrypted using a key that is a function of the segment signature. In other words, identical segments use identical encryption keys. Encrypted segments are combined together to form a full file. In order to be able to decompose segments these may be preceded by a size field, signature field (or signature ID field) and then the data itself.

Another way is to describe the segments lengths and IDs before the first segment starts. The file itself starts with the file signature (or the file signature ID) which is the key to the access permission process. Note that this technique increases the number of keys used to encrypt/decrypt a large file composed of several segments. This is necessary as the content of identical segments must remain identical also after the encryption. This procedure is detailed in FIG. 10.

Figure 10:
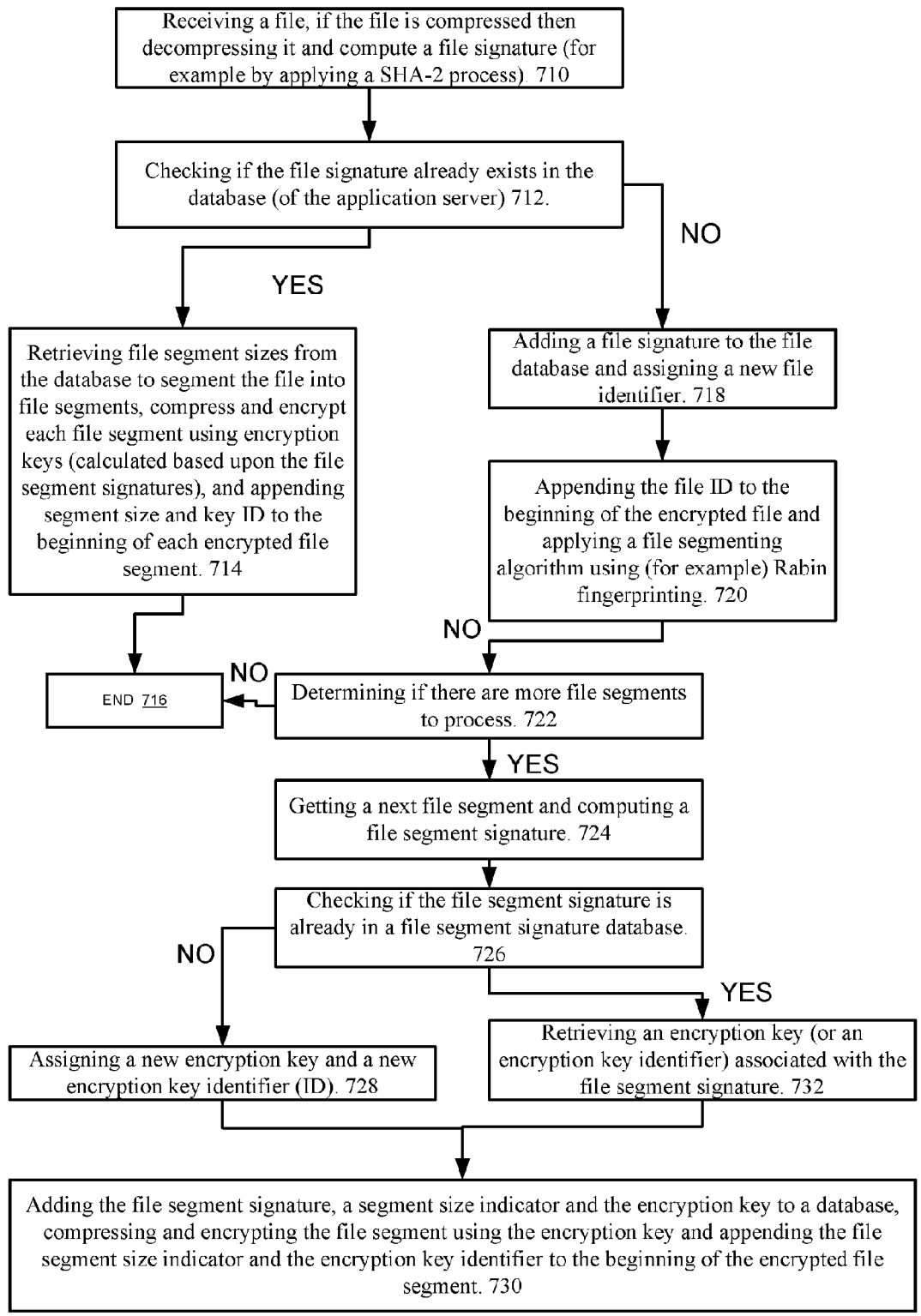
FIGS. 10-11 illustrate methods according to various embodiments of the invention.

FIG. 10 illustrates method 700 according to an embodiment of the invention.

Method 700 starts by stage 710 of receiving a file, if the file is compressed then decompressing it and compute a file signature (for example by applying a SHA-2 process). Stage 710 is followed by stage 712 of checking if the file signature already exists in the database (of the application server)—if so stage 712 is followed by stage 714, else stage 712 is followed by stage 718.

Stage 714 may include retrieving file segment sizes from the database to segment the file into file segments, compress and encrypt each file segment using encryption keys (calculated based upon the file segment signatures), and appending segment size and key ID to the beginning of each encrypted file segment. Stage 714 is followed by END stage 716.

Stage 718 may include adding a file signature to the file database and assigning a new file identifier. Stage 718 is followed by stage 720 of appending the file ID to the beginning of the encrypted file and applying a file segmenting algorithm using (for example) Rabin fingerprinting.

Stage 720 is followed by stage 722 of determining if there are more file segments to process—if so then stage 722 is followed by stage 724. If there are no file segments to process then stage 722 is followed by stage 716.

Stage 724 may include getting a next file segment and computing a file segment signature.

Stage 724 is followed by stage 726 of checking if the file segment signature is already in a file segment signature database and if so stage 726 is followed by stage 732 of retrieving an encryption key (or an encryption key identifier) associated with the file segment signature. Otherwise stage 726 is followed by stage 728 of assigning a new encryption key and a new encryption key identifier (ID). Stage 732 and 728 are followed by stage 730 of adding the file segment signature, a segment size indicator and the encryption key to a database, compressing and encrypting the file segment using the encryption key and appending the file segment size indicator and the encryption key identifier to the beginning of the encrypted file segment.

Figure 11:
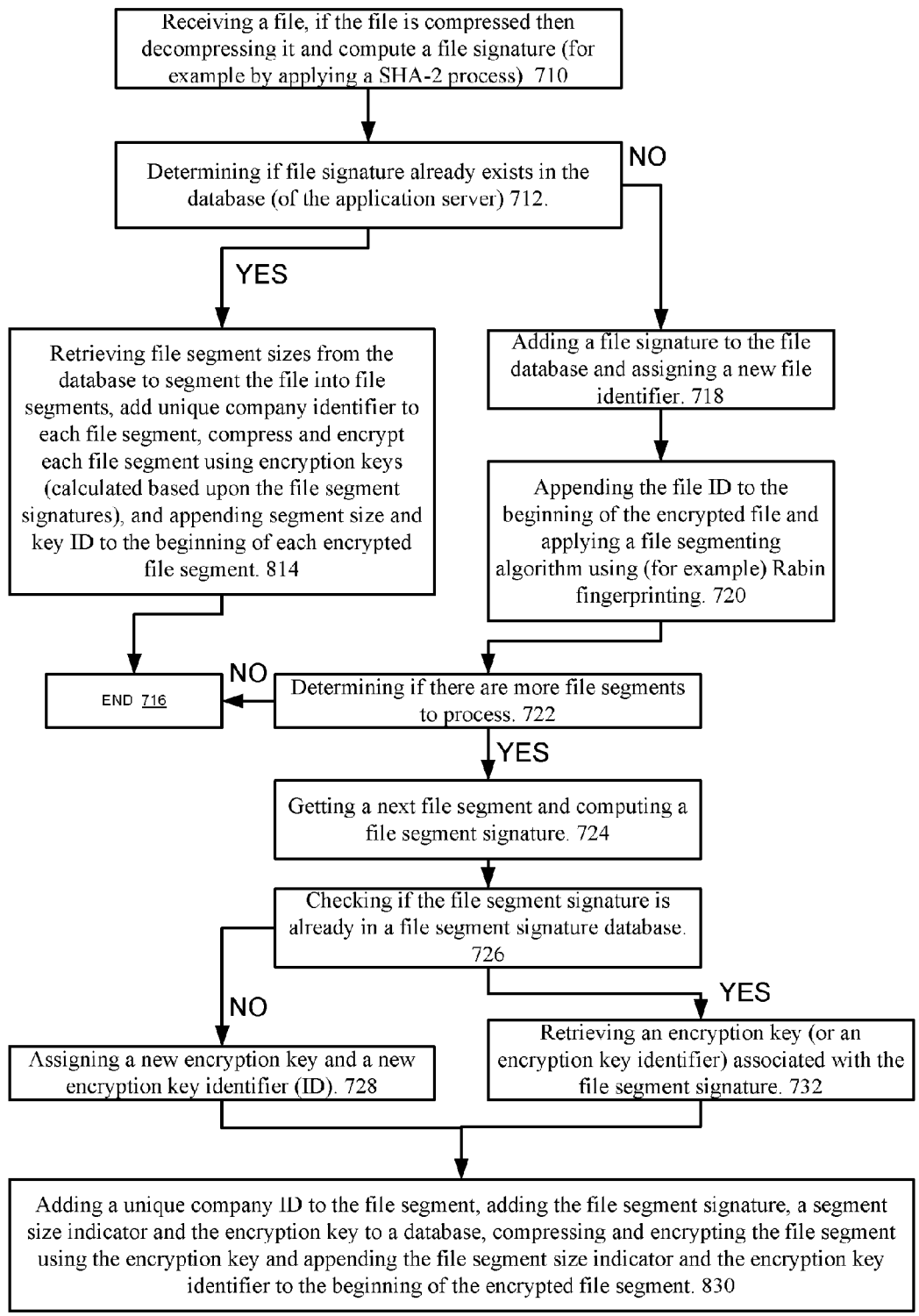

FIG. 11 illustrates method 800 according to an embodiment of the invention.

Method 800 differs from method 700 of FIG. 10 by including stages 814 and 830 instead of stages 714 and 730.

Stage 814 includes retrieving file segment sizes from the database to segment the file into file segments, add unique company identifier to each file segment, compress and encrypt each file segment using encryption keys (calculated based upon the file segment signatures), and appending segment size and key ID to the beginning of each encrypted file segment.

Stage 830 includes adding a unique company ID to the file segment, adding the file segment signature, a segment size indicator and the encryption key to a database, compressing and encrypting the file segment using the encryption key and appending the file segment size indicator and the encryption key identifier to the beginning of the encrypted file segment.

Figure 8B:
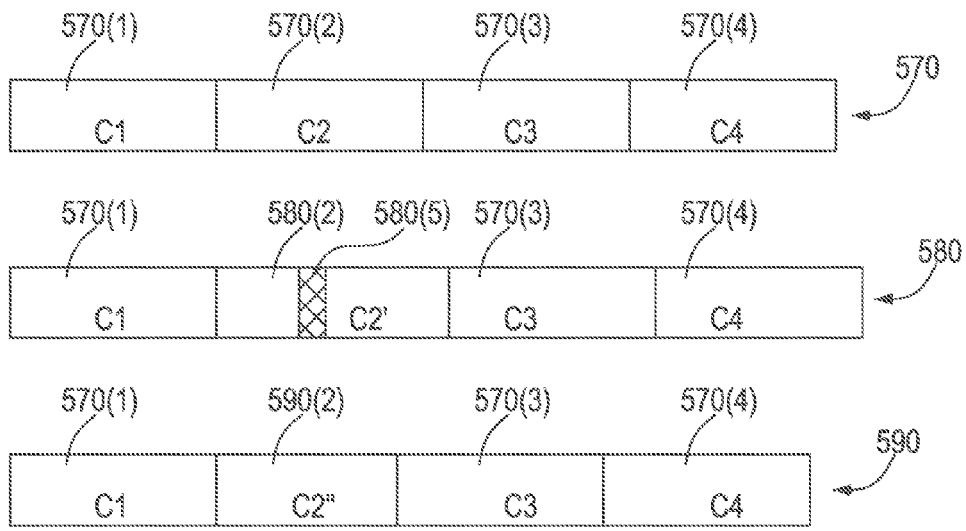
FIGS. 8B and 9B illustrate file segmentation and encryption processes according to various embodiments of the invention.
Figure 9B:
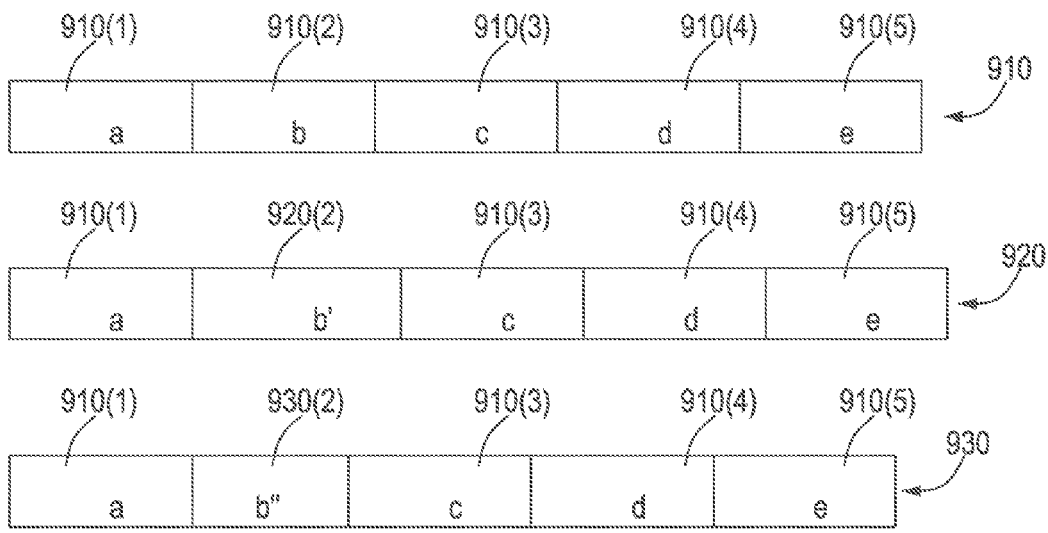

FIGS. 8B and 9B show that the native storage de-duplication still stays effective. There is a small reduction in the de-duplication efficiency as similarity is retained only at segment boundaries.

FIGS. 8B and 9B illustrate files 570, 580 and 590 before being encrypted.

File 570 includes segment 1, segment 2, segment 3 and segment 4 570(1), 570(2), 570(3) and 570(4).

File 580 includes segment 1, segment 2', segment 3 and segment 4 570(1), 580(2), 570(3) and 570(4). In comparison to file 570—segment 2' 580(2) differs from segment 2 570(2) as a result from adding information to segment 2.

File 590 includes segment 1, segment 2", segment 3 and segment 4 570(1), 590(2), 570(3) and 570(4). In comparison to file 570—segment 2" 590(2) differs from segment 2 570(2) as a result from removing information from segment 2.

FIGS. 8B and 9B also illustrate encrypted files 910-930 that provided by applying the de-duplication friendly encryption process on files 570-590.

Encrypted file 910 includes segment_a, segment_b, segment_c, segment_d and segment_e 910(1)-910(4).

Encrypted file 920 includes segment_a, segment_b', segment_c, segment_d and segment_e 910(1), 920(2), 910(3) and 910(4). In comparison to encrypted file 910—segment_b' 920(2) differs from segment_b 910(2).

Encrypted file 930 includes segment_a, segment_b", segment_c, segment_d and segment_e 910(1), 930(2), 910(3) and 910(4). In comparison to encrypted file 910—segment_b" 930(2) differs from segment_b 910(2).

Figure 12:
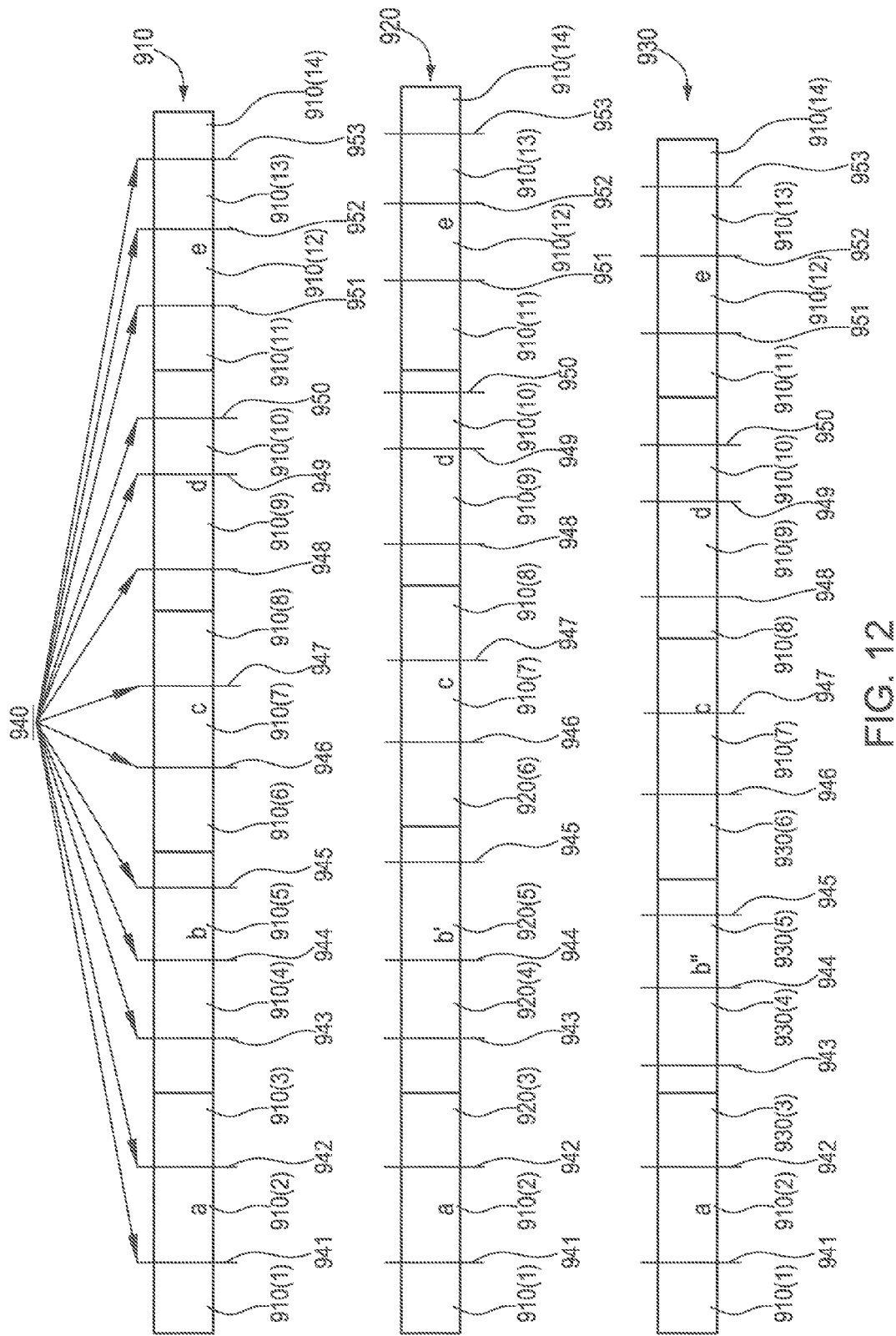
FIG. 12 illustrates file segmentation and encryption processes according to an embodiment of the invention.

File segments 910(1)-910(4), 920(2) and 930(2) were generated by the management system. The segmentation performed by the management system is independent of the storage service segmentation performed by the storage service. FIG. 12 also illustrates storage service segments and storage service anchors. The storage service segments are illustrated as being smaller than the file segments defined by the management server but they may be bigger than or even equal to the storage service segments.

Encrypted file 910 is segmented by the storage service to fourteen storage file segments 911(1)-911(14) by anchors 941-953.

Encrypted file 920 is segmented by the storage service to fourteen storage file segments 911(1)-911(2), 921(3)-921(7) and 911(8)-911(14). Storage service segments 921(3)-921(7) differ from storage service segments 911(3)-911(7) as they include data from file segment 920(2).

Encrypted file 930 is segmented by the storage service to thirteen storage file segments 911(1)-911(2), 931(3)-931(5) and 911(6)-911(13). Storage service segments 921(3)-921(7) differ from storage service segments 911(3)-911(7) as they include data from file segment 920(2).

According to various embodiments of the invention and in order to lower the overhead associated with a large number of keys a practical selection of the segmentation algorithm may be the following:

a. Use larger segments than in the original de-duplication papers. While the underlying native segmenting protocol may have a different structure we can assume that if their segments are M bytes on average and our segments are k*M, so each segment will include an order of k−1 original segments. Practical numbers are M=4 Kbytes and K=16. Note that using larger segments will make the file syncs less efficient, and will require the system to encrypt larger portions of the file, even if the user changed a small part of the file. Therefore, the size of the segments trades-off the number of keys with the efficiency of syncing and the amount of bits that would be needed to be encrypted every time a file is slightly changed.

b. It does not make sense to deal with files which are less than 3 segments—the system will only segment files above 200 KB.

c. Note that since we always use a file signature based key (derived from its signature), de-duplication still work for identical files that are not segmented.

d. In order to hide de-duplication between different accounts, FIG. 11 describe an encryption methodology that preserves file similarity only within a single account or a single company. This is achieved by adding the company ID to the data of each segment (before the encryption is applied). Hiding de-duplication is important as several security issues were reported in Dropbox that exploited the ability to understand that specific files or objects (including slightly modified files and objects) are already uploaded to Dropbox by monitoring traffic between client device and the web.

e. Another way to accomplish the same goal of (d) is by changing the de-duplication scheme by company. This can be easily accomplished using a different Rabin Fingerprint seed or CRC polynomial for each user account and/or applying a different Boolean function on the remainder to determine the place of an anchor.

f. Instead of having a single key for each segment, we can use a random salt or an IV for the same key. This could reduce the number of keys, and also reduce the overhead of setting up a secure key exchange for each file segment.

Using Device App and New File Types for File System Expansion

The management application on a device is called each time the user clicks on a file in the Dropbox folder (as well as other cloud storage file browser, email attachment, etc.) whose type is unique and the management application has registered for this file type. This methodology was described for the decryption of files that were encrypted by the management server directly on the Dropbox account.

Such methodology allows the management server to use the cloud storage application for accessing files that are located outside this service, while still placing them within the desired folders of the same cloud service (e.g., certain files within the Dropbox tree will be located outside Dropbox). Instead of the real files, the management server may place short files with a new type that only include pointers to files, so each time the user clicks on a pointer type file (filename. doc-elsewhere of type doc-elsewhere, with an icon that match exactly a doc file), the management application gets called. This file contains a short pointer to the real file which is stored in another file repository or on the management server. It may be also an encrypted repository that belongs to the enterprise. The management application then fetches this file from the other repository. Access control can be controlled by the server side including the following file features:

a. Password protected access. The app may open a password input dialog window to the user and then allow the download of the file.

b. Upon requesting a specific file more than once, the management server or the client app may position the original file in Dropbox and discard the pointer file. This results in using Dropbox as cache for a much larger file system with the inactive files replaced by pointer files during the tree browsing process.

c. Entire corporate directories (folders, sub-folders and pointers) can be mounted on Dropbox using only a fraction of the storage.

Files which are called via Dropbox can be cached in the specific app that called the file.

Figure 14:
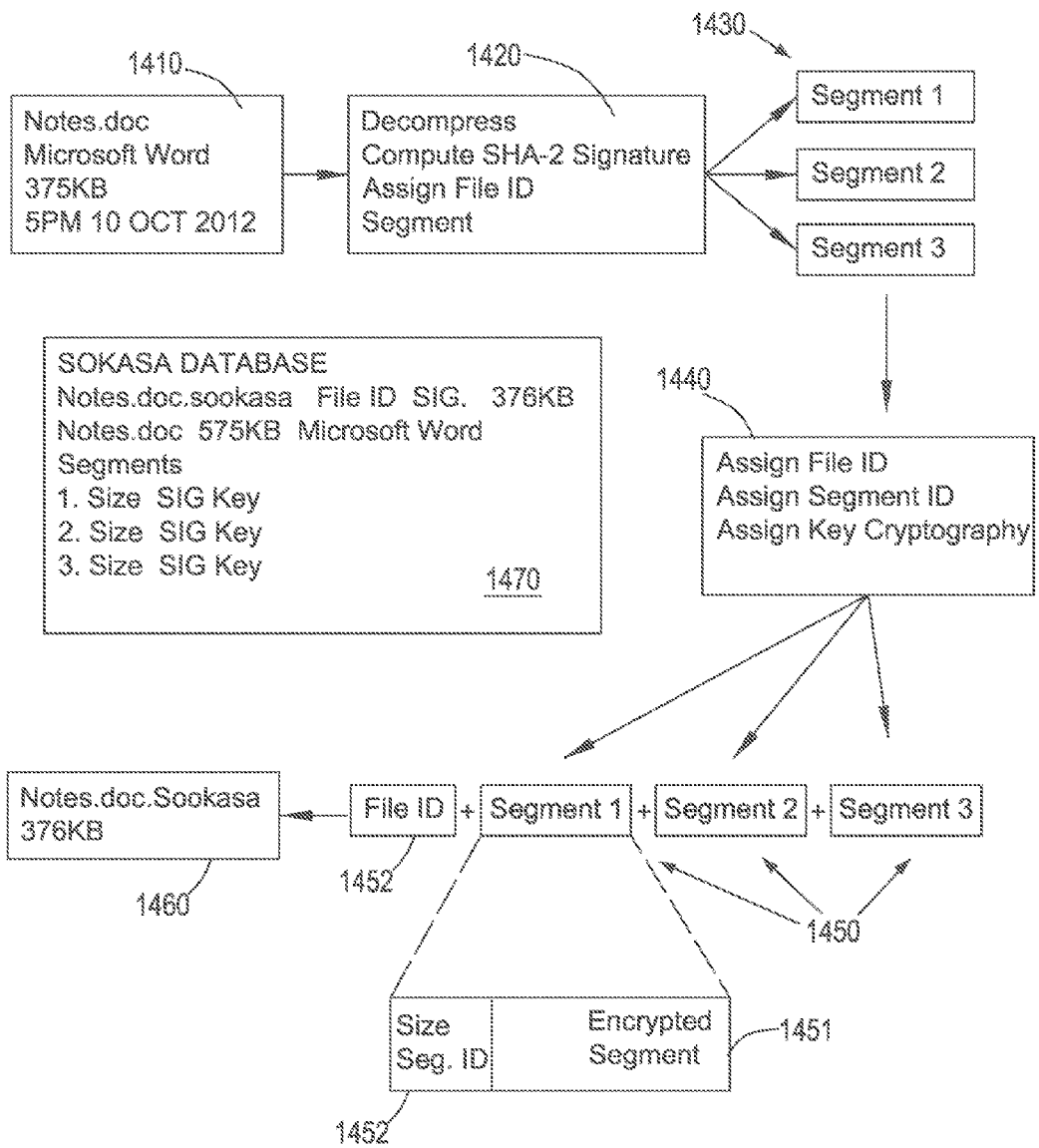

FIGS. 13-14 illustrate files, files segments and various processes according to various embodiments of the invention.

File 1410 is a Microsoft WORD compliant file, is named NOTES.DOC, and is 375 Kbyte long.

The file 1410 is processed by a first process (1420) that includes decompression, signature computation (such as SHA2 signature computation denoted 1241 in FIG. 15), segmentation and segment signature computation to provide three file segments (1430): SEGMENT 1 (of SIZE 1 and SEGMENT SIGNATURE 1), SEGMENT 2 (of SIZE 2 and SEGMENT SIGNATURE 2). The file segments are processed by a second process (1440) that includes assigning file identifier, assigning file segment identifiers and assigning key cryptography to provide encrypted file segments 1450. Each encrypted file segment includes an encrypted content 1451, size information and segment identifier 1452. These encrypted file segments and the encrypted file identifier 1455 form encrypted file 1460 represented in database 1470 by record 1472.

The database 1470 may include the name of the original file (NOTES.COM), the size of the original file (375 KB), a file identifier (XYZ . . . ), the name of the encrypted file (also referred to as secure file NOTES.DOC.SOOKASA), time of creation of the encrypted file (5:01 PM 10 OCT 2012), and encrypted file segment information such as encrypted file segment identifier, size, signature cryptographic key (SEGMENT ID, SIZE, SIGNATURE, CRYPTO KEY) per encrypted file segment.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

Figure 15:
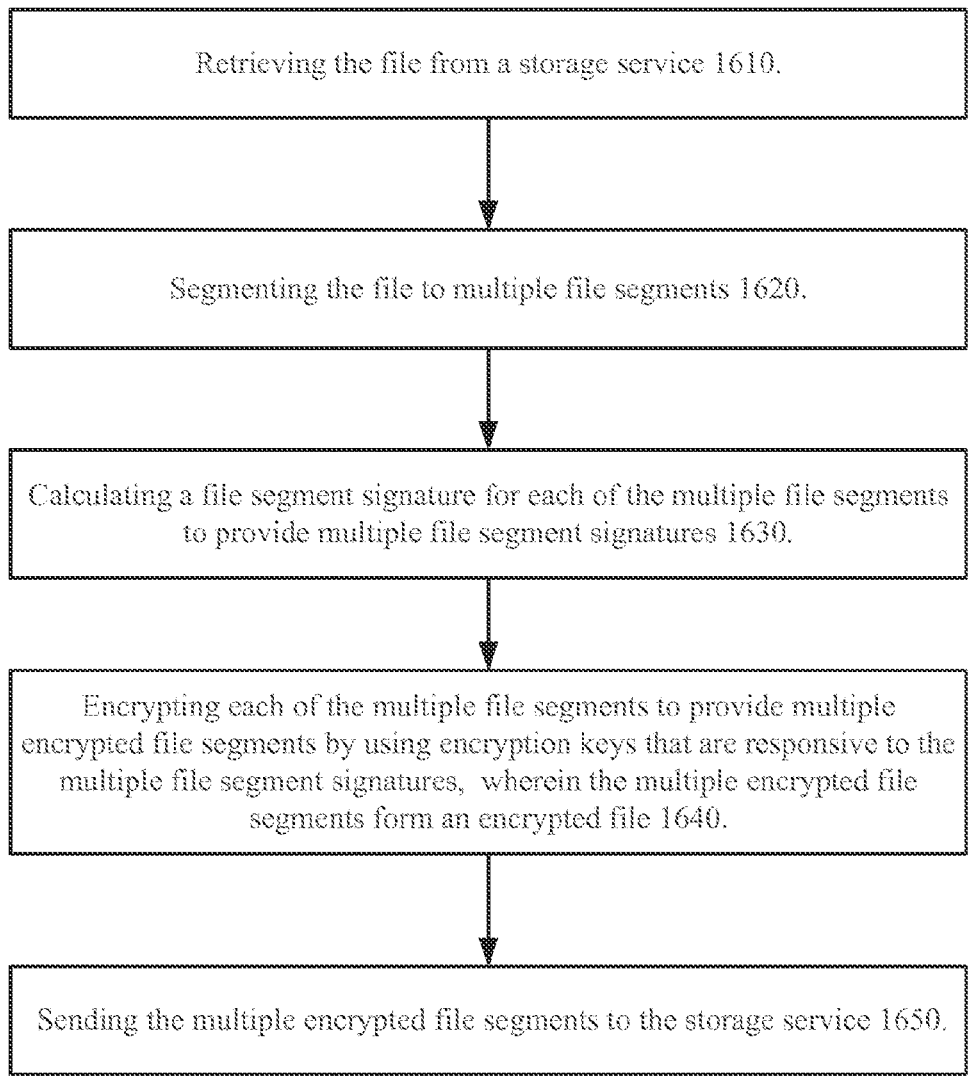

FIGS. 15-17 illustrate method 1600 according to an embodiment of the invention.

Method 1600 may include: retrieving the file from a storage service 1610; segmenting the file into multiple file segments 1620; calculating a file segment signature for each of the file segments to provide multiple file segment signatures 1630; encrypting each of the multiple file segments to provide multiple encrypted file segments by using encryption keys that are responsive to the multiple file segment signatures, wherein the multiple encrypted file segments form an encrypted file 1640; and sending the multiple encrypted file segments to the storage service 1650.

The segmenting of the file (1620) into multiple file segments may be executed regardless of a file segmentation scheme applied on the file by the storage service, such as a file segmentation scheme applied on the file by the storage service for de-duplication purposes.

The method may also include the following stages:
a. Deleting the file from the storage service 1660.
b. Calculating each encryption key in response to a file segment signature associated with a file segment that is encrypted by the encryption key 1662.
c. Associating with the multiple encrypted file segments, the multiple file segment signatures 1664.
d. Flagging the encrypted file as being encrypted 1666.
e. Flagging the encrypted file as being encrypted by altering the file type of the encrypted file 1668.
f. Exposing the encrypted file to a user of the management server through an interface of the storage service 1670.
g. Separating (during the segmenting) between text content of the file and image content of the file 1672.
h. Preventing the segmenting, the calculating and the encrypting of the file if the file has been modified by a user of the storage service during a predetermined period from a moment of retrieval of the file by the management server 1674.
i. Preventing the deletion of the file if the file has been modified by a user of the storage service during a predetermined period from a moment of retrieval of the file 1676.
j. Finding (during the segmenting) initial file segments by applying a first segmentation process; and defining each file segment as comprising multiple initial file segments 1678.
k. Finding the initial file segments by applying at least one process out of Rabin fingerprint process and cyclic redundancy code (CRC) process 1680.
l. Using segmentation parameters for segmenting a file associated with a specific user and using different segmentation parameters for segmenting another file that is associated with another user that differs from the specific user 1682.
m. Using encryption parameters for encrypting a file associated with a specific user and using different encryption parameters for encrypting another file that is associated with another user that differs from the specific user 1684.
n. Using segmentation parameters for segmenting a file associated with a user of a certain group of users and using different segmentation parameters for segmenting another file that is associated with another user of another group of users 1686.
o. Using encryption parameters for encrypting a file associated with a user of a certain group of users and using different encryption parameters for encrypting another file that is associated with another user of another group of users 1686.
p. Adding a user identifier to each file segment. The user identifier identifies a user associated with the file 1688.
q. Associating identical file segments with identical encryption keys 1670
r. Retrieving the file from the storage service, encrypting the file by the management server independent of an encryption applied by a storage service that stores the file 1672.
s. Segmenting the file by the management server while applying a second de-duplication policy that is defined independent of a first de-duplication policy applied by a storage service that stores the file 1674.
t. Retrieving the file from a dedicated folder that is allocated for files to be encrypted 1676.
u. Creating a new folder for files to be encrypted, wherein the folder is exposed to the user 1678.

v. Retrieving the file from a dedicated folder that is allocated to files to be encrypted 1680.

w. Flagging the encrypted file as being encrypted 1682.

x. Changing the file type of a file to a type that is indicative of the encryption of the file 1684.

y. Sending the file to a cache memory before starting the segmenting, the calculating, and the encrypting 1686.

The segmenting, the calculating and the encrypting may be executed by a management server.

Figure 18:
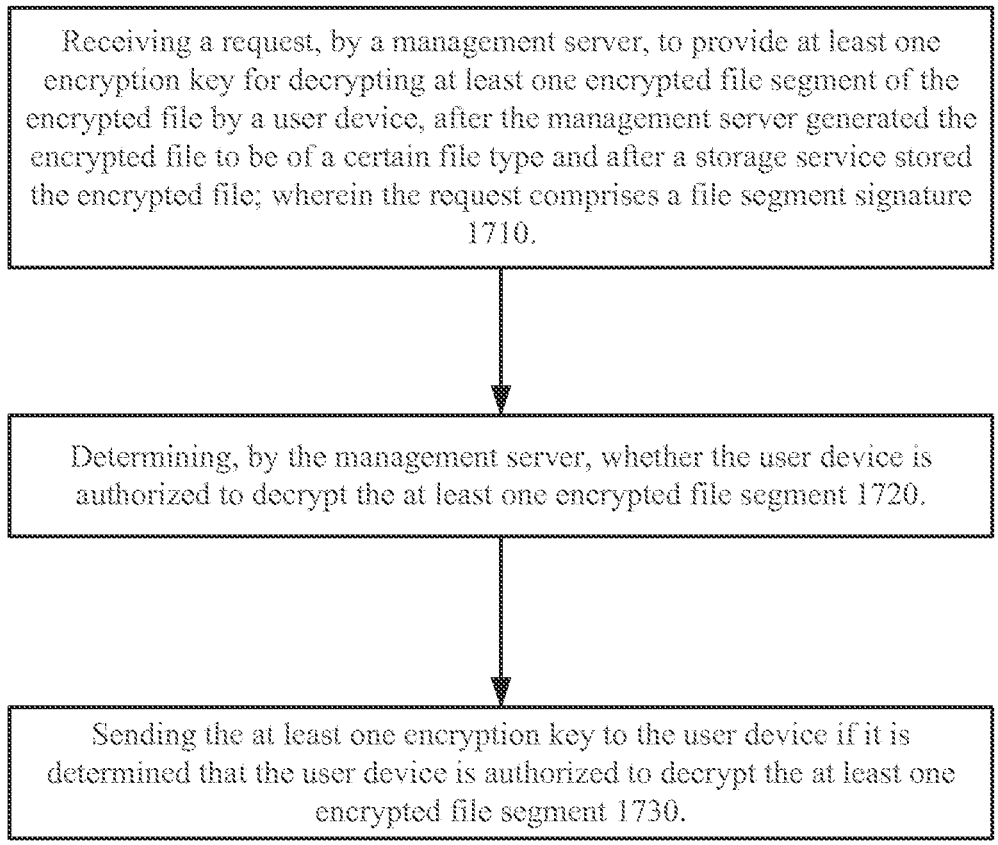

FIG. 18 illustrates method 1700 according to an embodiment of the invention.

Method 1700 may include:

a. Receiving a request, by a management server, to provide at least one encryption key for decrypting at least one encrypted file segment of the encrypted file by a user device, after the management server generated the encrypted file to be of a certain file type and after a storage service stored the encrypted file; wherein the request comprises a file segment signature 1710.

b. Determining, by the management server, whether the user device is authorized to decrypt the at least one encrypted file segment 1720.

c. Sending the at least one encryption key to the user device if it is determined that the user device is authorized to decrypt the at least one encrypted file segment 1730.

Stage 1730 may include sending a single encryption key for encrypting all the file segments of a file.

Stage 1730 may include sending at least one encryption key that is responsive to a content of the at the least one encrypted file segment.

Stage 1710 may include receiving the request from an application that is regarded by the operating system hosted by the user device to be associated with files of the certain file type.

At least one of the management server and the storage service belong to a cloud computing environment.

Figure 19:
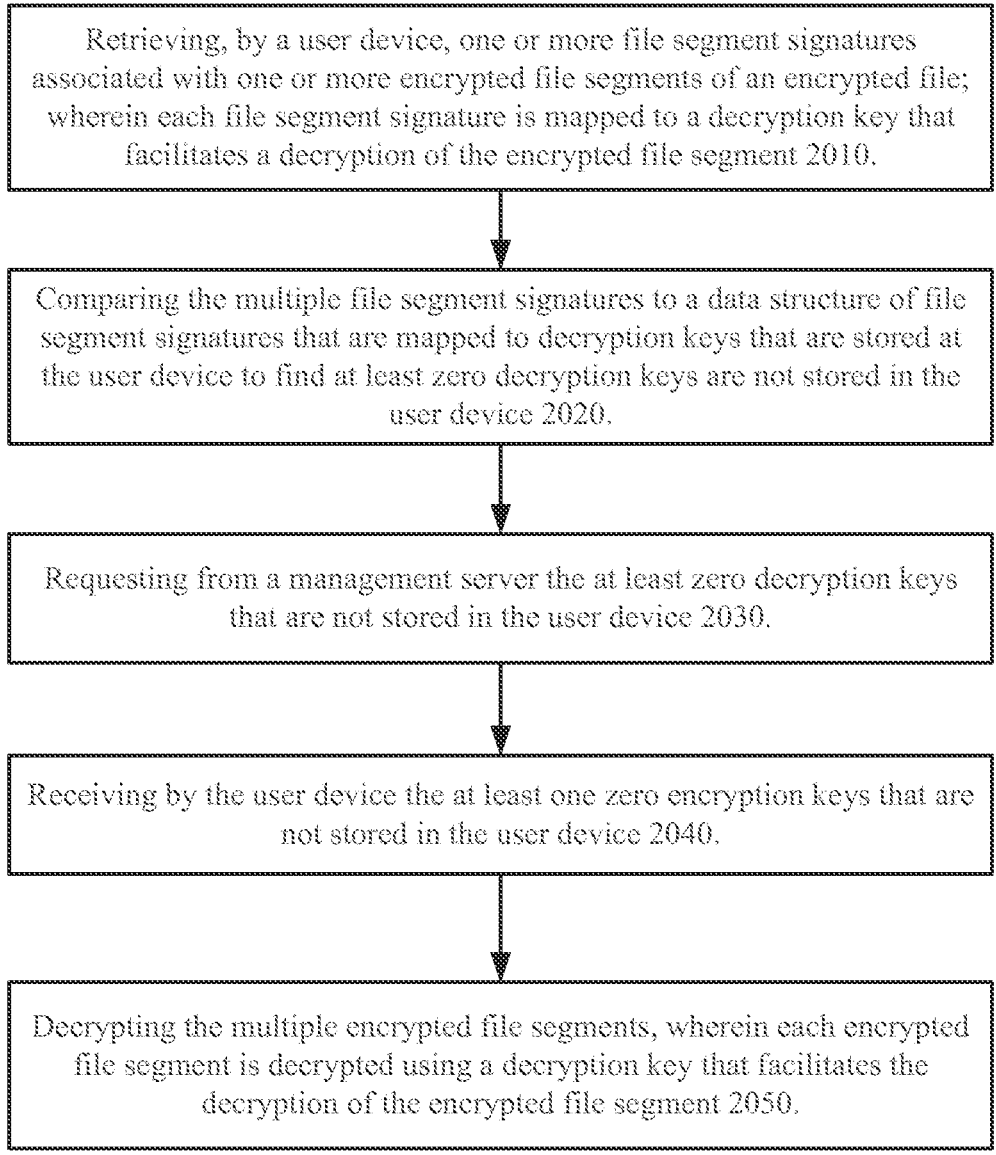

FIG. 19 illustrates method 2000 according to an embodiment of the invention.

Method 2000 may include:

a. Retrieving, by a user device, one or more file segment signatures associated with one or more encrypted file segments of an encrypted file; wherein each file segment signature is mapped to a decryption key that facilitates a decryption of the encrypted file segment 2010.

b. Comparing the multiple file segment signatures to a data structure of file segment signatures that are mapped to decryption keys that are stored at the user device to find at least zero decryption keys are not stored in the user device 2020.

c. Requesting from a management server the at least zero decryption keys that are not stored in the user device 2030. If all the keys are stored in the user device then zero keys are requested (are not requested at all) else— one or more keys are requested.

d. Receiving by the user device the at least one encryption keys that are not stored in the user device 2040.

e. Decrypting the multiple encrypted file segments, wherein each encrypted file segment is decrypted using a decryption key that facilitates the decryption of the encrypted file segment 2050.

The decrypting (2050) of a certain file segment can be done by using a decryption key that is calculated based upon a file segment signature and its metadata field associated with the certain file segment.

Figure 20:
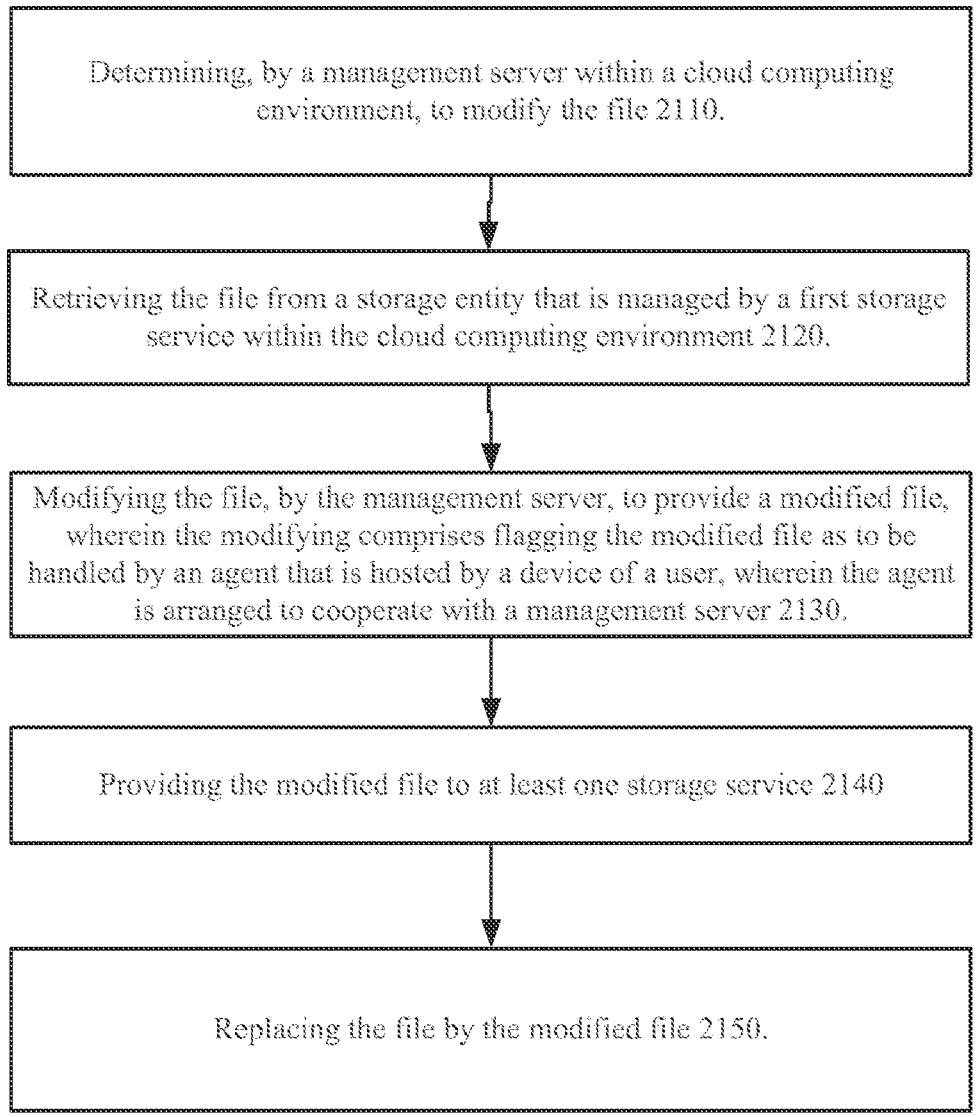

FIG. 20 illustrates method 2100 according to an embodiment of the invention.

Method 2100 may include:

a. Determining, by a management server within a cloud computing environment, that the file needs to be modified 2110.

b. Retrieving the file from a storage entity that is managed by a first storage service within the cloud computing environment 2120.

c. Modifying the file, by the management server, to provide a modified file, wherein the modifications comprise flagging the modified file as to be handled by an agent that is hosted by a device of a user, wherein the agent is arranged to cooperate with a management server 2130.

d. Providing the modified file to at least one storage service 2140 e. Replacing the file by the modified file 2150.

The determining action (2110) may be executed without any intervention from the user of the device, may be triggered by the user of the device, may be triggered by a determination to modify another file that is similar to the file, may be in response to a content of the file or to metadata associated with this file.

The determining action (2110) may be in response to a placement of the file within a folder that is defined as including files that should be modified, or may be in response to a lapse of at least a predetermined time period during which the file is not altered, the predetermined time period starts from a moment that the file is stored in a folder that is defined as including files that should be modified.

The modifying action (2130) may include changing a content of the file, encrypting the file, encrypting the file if it determined that a security level of the file is not adequate, generating the modified file to comprise access information to another location in which the modified file is to be stored, and storing the modified file at the other location, flagging the file by altering the file type of the file to a predefined file type to be handled by the management application.

The providing action (2140) may include scanning multiple storage entities that are managed by different storage services in the cloud computing environment to find files that are candidates for modification.

The modified file may consist essentially of access information to the file and flagging information that indicates to the agent that the modified file is to be handled by the agent.

The method may also include retrieving by the agent the modified file; and requesting of the file by the agent from the management server, in response to the retrieval of the modified file, wherein the file and the modified file are stored at different locations. The user device that hosts the agent may be prevented from directly accessing the first storage device.

The method may include repeating the retrieving, the modifying and providing actions for each file of a first folder of the first storage device to provide a second folder of modified files wherein the first and second folders have substantially a same structure.

The method may include repeating the retrieving, the modifying and providing actions for each file of a first group of files stored by the first storage device to provide a second group of modified files wherein the first and second groups of files have substantially a same structure.

Figure 21:
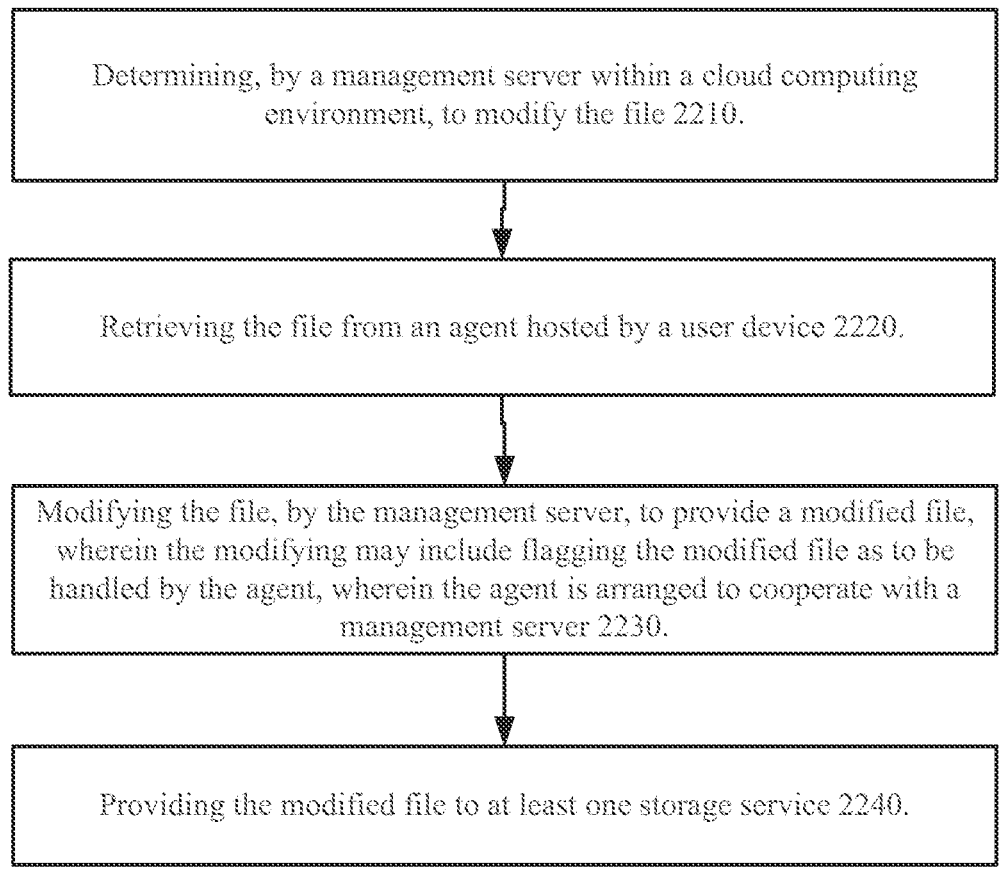

FIG. 21 illustrates method 2200 according to an embodiment of the invention.

Method 2200 may include:

a. Determining, by a management server within a cloud computing environment, that the file needs to be modified 2210.

b. Retrieving the file from an agent hosted by a user device 2220.

c. Modifying the file, by the management server, to provide a modified file, wherein the modifications may include flagging the modified file as to be handled by the agent, wherein the agent is arranged to cooperate with a management server 2230.

d. Providing the modified file to at least one storage service 2240.

Figure 22:
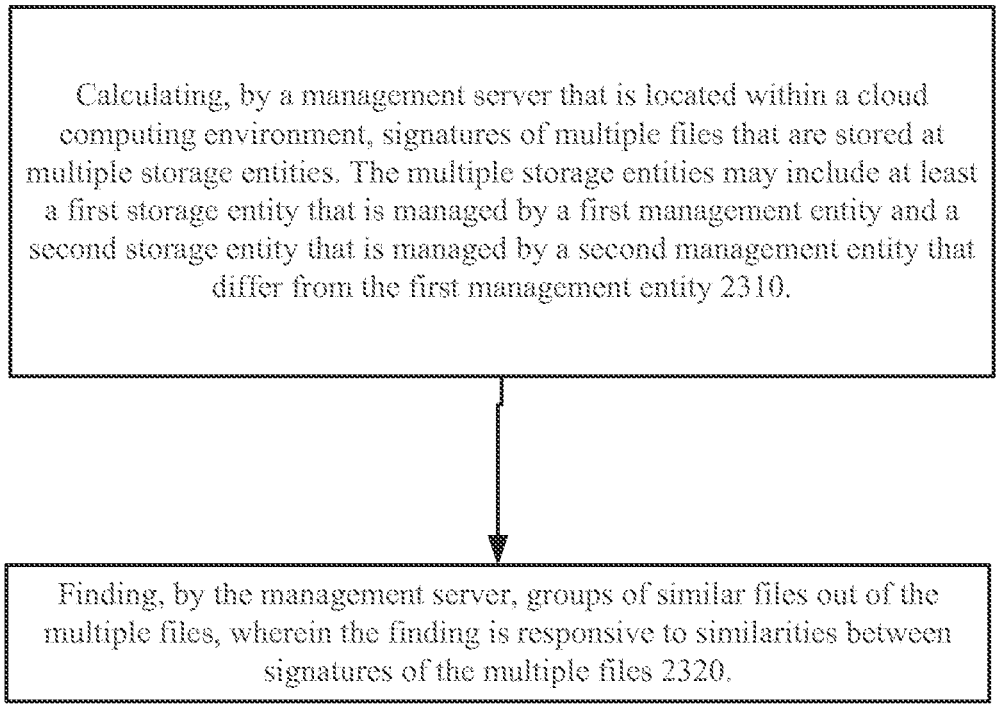

FIG. 22 illustrates method 2300 according to an embodiment of the invention.

Method 2300 may include:

a. Calculating, by a management server that is located within a cloud computing environment, signatures of multiple files that are stored at multiple storage entities. The multiple storage entities may include at least a first storage entity that is managed by a first management entity and a second storage entity that is managed by a second management entity that differ from the first management entity 2310.

b. Finding, by the management server, groups of similar files out of the multiple files, wherein the finding is responsive to similarities between signatures of the multiple files 2320.

The first and second management entities may be cloud storage services.

Stage 2310 may include at least one of the following:

a. Calculating, for each file of the multiple files, a signature of the file that is in response to a content of multiple segments of the file.

b. Calculating of the signature of the file by segmenting the file to provide the multiple segments of the file, and calculating a unique file segment signature for each segment of the file based upon a content of the segment of the file, wherein unique file segment signatures of different values are calculated for segments of the file that differ from each other by content.

c. Generating the signature of the file by compressing the unique file segment signatures to provide compressed file segment signatures and combining the compressed file signatures to provide the signature of the file.

The compressed file signatures may be at least fifty percent smaller than the unique file segment signatures.

The unique file segment signatures may be at least thirty eight bytes long.

The unique file segment signature may be at least forty eight bytes long.

The compressed file signatures may be at least eighty percent smaller than the unique file segment signatures.

The compressed file signatures may be at least ninety percent smaller than the unique file segment signatures.

The compressed file signatures may be unique or non-unique.

The segmenting action may maintain a separation between image content of the file and text content of the file.

The method may include at least one of the following stages (illustrated in FIG. 23):

a. Segmenting only the text content of the file and preventing a segmentation of a single image of the file 2330.

b. Replacing at least one file of a group of similar files by a more updated file of the group of similar files 2332.

c. Deleting most files of a group of similar files based upon usage patterns of multiple files of the group of similar files 2334.

d. Maintaining a most updated file of the group of similar files 2336.

e. Detecting files that belong to the group of similar files based upon the signatures of the files 2338.

f. Monitoring a usage of the multiple files 2340.

g. Generating a history of usage of files that belong to a group of similar files 2342.

h. Determining that different files of a group of similar files are either the same file or different version of the file, and generating a history of usage of that file 2344.

i. Enforcing a storage policy on a first file of a group of similar files based upon a compliance with the storage policy of storage of a second file of the group of similar files 2346.

j. Defining a policy on a first file of a group of similar files based upon the policy of a folder of a second file of the same group of similar files. The policy may be a file access policy 2348.

At least one management entity may be an enterprise file system.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media that is permanent, removable or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time-multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected" or "operably coupled" to each other to achieve the desired functionality.

Furthermore, those skilled in the art will recognize that boundaries between the above described operations are merely illustrative. The multiple operations may be combined into a single operation, a single operation may be divided into additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may be implemented as software or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for file management, the method comprises:
    calculating, by a management server that is located within a cloud computing environment, signatures of multiple files that are stored at multiple storage entities; and
    finding, by the management server, groups of similar files out of the multiple files, wherein the finding is in response to similarities between signatures of the multiple files;
    wherein the multiple storage entities comprise at least a first storage entity that is managed by a first management entity and a second storage entity that is managed by a second management entity that differs from the first management entity.

2. The method according to claim 1 wherein the first and second management entities are cloud storage services.

3. The method according to claim 1, comprising calculating, for each file of the multiple files, a signature of the file that is in response to a content of multiple segments of the file.

4. The method according to claim 2, wherein the calculating of the signature of the file comprises:
    segmenting the file to provide the multiple segments of the file, and
    calculating a unique file segment signature for each segment of the file based upon a content of the segment of the file, wherein unique file segment signatures of different values are calculated for segments of the file that differ from each other by content.

5. The method according to claim 4, comprising:
    generating the signature of the file by compressing the unique file segment signatures to provide compressed file segment signatures and combining the compressed file signatures to provide the signature of the file.

6. The method according to claim 4, wherein the compressed file signatures are at least fifty percent smaller than the unique file segment signatures.

7. The method according to claim 4, wherein the unique file segment signatures are at least thirty eight bytes long.

8. The method according to claim 4, wherein the unique file segment signature are at least forty eight bytes long.

9. The method according to claim 4, wherein the compressed file signatures are at least eighty percent smaller than the unique file segment signatures.

10. The method according to claim 4, wherein the compressed file signatures are at least ninety percent smaller than the unique file segment signatures.

11. The method according to claim 4, wherein the compressed file signatures are non-unique.

12. The method according to claim 4, wherein the segmenting maintains a separation between image content of the file and text content of the file.

13. The method according to claim 12, comprising segmenting only the text content of the file and preventing a segmentation of a single image of the file.

14. The method according to claim 1, further comprising replacing at least one file of a group of similar files by a more updated file of the group of similar files.

15. The method according to claim 1, further comprising deleting a majority of files of a group of similar files based upon usage patterns of multiple files of the group of similar files.

16. The method according to claim 15, comprising maintaining a most updated file of the group of similar files.

17. The method according to claim 15 comprising detecting files that belong to the group of similar files based upon the signatures of the files.

18. The method according to claim 15, further comprising monitoring a usage of the multiple files.

19. The method according to claim 18, further comprising generating a history of usage of files that belong to a group of similar files.

20. The method according to claim 18, comprising determining that different files of a group of similar files are either a same file or different version of the file, and generating a history of usage of that file.

21. The method according to claim 1, comprising enforcing a storage policy on a first file of a group of similar files based upon an compliance with the storage policy of a storage of a second file of the group of similar files.

22. The method according to claim 1, comprising defining a policy on a first file of a group of similar files based upon the policy of a folder of a second file of the same group of similar files.

23. The method according to claim 22, wherein the policy is a file access policy.

24. The method according to claim 1, wherein at least one management entity is an enterprise file system.

25. A non-transitory computer readable medium that stores instructions for: calculating, by a management server that is located within a cloud computing environment, signatures of multiple files that are stored at multiple storage entities; and finding, by the management server, groups of similar files out of the multiple files, wherein the finding is in response to similarities between signatures of the multiple files; wherein the multiple storage entities comprise at least a first storage entity that is managed by a first cloud storage service and a second storage entity that is managed by a second cloud storage service that differs from the first cloud storage service.

* * * * *